US011928564B2

(12) United States Patent
He et al.

(10) Patent No.: US 11,928,564 B2
(45) Date of Patent: *Mar. 12, 2024

(54) MACHINE-LEARNED PREDICTIVE MODELS AND SYSTEMS FOR DATA PREPARATION RECOMMENDATIONS

(71) Applicant: MICROSOFT TECHNOLOGY LICENSING, LLC, Redmond, WA (US)

(72) Inventors: Yeye He, Bellevue, WA (US); Cong Yan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/969,377

(22) Filed: Oct. 19, 2022

(65) Prior Publication Data

US 2023/0043015 A1 Feb. 9, 2023

Related U.S. Application Data

(63) Continuation of application No. 16/886,155, filed on May 28, 2020, now Pat. No. 11,488,068.

(60) Provisional application No. 63/008,387, filed on Apr. 10, 2020.

(51) Int. Cl.
G06F 15/16 (2006.01)
G06F 9/54 (2006.01)
G06N 5/02 (2023.01)
G06N 20/00 (2019.01)
H04L 29/06 (2006.01)

(52) U.S. Cl.
CPC ............. *G06N 20/00* (2019.01); *G06N 5/02* (2013.01)

(58) Field of Classification Search
CPC .................................. G06N 20/00; G06N 5/02
USPC ........................................................... 706/12
See application file for complete search history.

(56) References Cited

U.S. PATENT DOCUMENTS

| 7,756,804 | B2 * | 7/2010 | Bloom | G06F 16/285 |
| | | | | 706/46 |
| 8,898,592 | B2 * | 11/2014 | Loughlin | G06F 3/0483 |
| | | | | 715/810 |
| 9,720,939 | B1 * | 8/2017 | Andrews | G06F 16/21 |
| 10,289,704 | B1 * | 5/2019 | Andrews | G06F 16/2465 |
| 11,023,101 | B2 * | 6/2021 | Chiluvuri | G06F 3/04847 |
| 11,250,515 | B1 * | 2/2022 | Feiteira | G06N 20/00 |
| 2005/0119911 | A1 * | 6/2005 | Ayan | G01V 11/00 |
| | | | | 703/10 |
| 2011/0191277 | A1 * | 8/2011 | Ag ndez Dominguez | ................ |
| | | | | G06N 5/025 |
| | | | | 706/12 |

(Continued)

*Primary Examiner* — Hamza N Algibhah
(74) *Attorney, Agent, or Firm* — Workman Nydegger

(57) ABSTRACT

Systems are provided for facilitating the building and use of models used to make data preparation recommendations. The systems identify ground truth from a plurality of notebooks and utilizes the ground truth to generate the corresponding data preparation recommendation models. The data preparation recommendation models are used to predict accurate (e.g., useful and relevant) data preparations steps based on user input and user notebook data. The data preparation computing system generates a recommendation prompt based on output from the data preparation recommendation model that can be viewed and/or selected by the user to be applied to the user's notebook data.

20 Claims, 19 Drawing Sheets

(56) References Cited

U.S. PATENT DOCUMENTS

| | | | |
|---|---|---|---|
| 2012/0166486 A1* | 6/2012 | Visser | G06F 40/177 |
| | | | 707/E17.049 |
| 2012/0323558 A1* | 12/2012 | Nolan | G06F 40/30 |
| | | | 704/E11.001 |
| 2015/0379426 A1* | 12/2015 | Steele | G06N 5/025 |
| | | | 706/12 |
| 2016/0267396 A1* | 9/2016 | Gray | G06N 20/00 |
| 2018/0189680 A1* | 7/2018 | Gupta | G06F 8/38 |
| 2020/0081916 A1* | 3/2020 | McShane | G06N 20/00 |
| 2021/0041991 A1* | 2/2021 | Chiluvuri | G06N 20/00 |
| 2021/0133439 A1* | 5/2021 | Mehra | G06V 30/414 |
| 2022/0188568 A1* | 6/2022 | Singh | G06N 3/0454 |

\* cited by examiner

FIG. 2

```
1  import pandas as pd
2
3  psg=pd.read_csv('passenger_data.csv')
4  surv=pd.read_csv('survive.csv')
5  psg=psg.merge(surv,on='PassengerId',
       how='left')
6  psq.pivot(headers=['Survived','Pclass'],
       index='Sex', aggfunc='count')
7  psg.groupby('Sex',aggfunc='count')
```

| Sector | Ticker | Company | Year | Quarter | Market Cap | Revenue |
|---|---|---|---|---|---|---|
| Aerospace | AJRD | AEROJET ROCKETD | 2006 | Q1 | 1442.67 | 472.07 |
| Aerospace | AJRD | AEROJET ROCKETD | 2006 | Q2 | 1514.80 | 489.22 |
| ... | ... | ... | ... | ... | ... | ... |
| Aerospace | BA | BOEING CO | 2006 | Q1 | 343.41 | 210.66 |
| ... | ... | ... | ... | ... | ... | ... |
| Utilities | YORW | YORK WATER CO | 2008 | Q4 | 600.19 | 171.73 |

1010

Index: [Sector, Ticker, Company]
Column: [Year]

| Sector | Ticker | Company | 2006 | 2007 | 2008 |
|---|---|---|---|---|---|
| Aerospace | AJRD | AEROJET ROCKETD | 6218.09 | 6342.45 | 7088.62 |
| | ATRO | ASTRONICS CORP | 1050.97 | 1071.99 | 1198.11 |
| Business Services | HHS | HARTE-HANKS INC | 2473.75 | 2523.22 | 2820.07 |
| | NCMI | NATL CINEMEDIA | 856.92 | 874.06 | 976.89 |
| Consumer Staples | YTEN | TIELD10 BIOSCI | 533.13 | 543.79 | 607.77 |
| ... | ... | ... | ... | ... | ... |
| Utilities | YORW | YORK WATER CO | 1902.37 | 1940.42 | 2168.70 |

| Ticker | Company | Year | Aerospace | Business Services | ... | Utilities |
|---|---|---|---|---|---|---|
| AJRD | AEROJET ROCKETD | 2006 | 6218.09 | NULL | ... | NULL |
| AJRD | AEROJET ROCKETD | 2007 | 6342.45 | NULL | ... | NULL |
| AJRD | AEROJET ROCKETD | 2008 | 7088.62 | NULL | ... | NULL |
| ATRO | ASTRONICS CORP | 2006 | 1050.97 | NULL | ... | NULL |
| ... | ... | ... | ... | ... | ... | ... |
| HHS | HARTE-HANKS INC | 2006 | NULL | 2473.75 | ... | NULL |
| ... | ... | ... | ... | ... | ... | ... |
| YORW | YORK WATER CO | 2008 | NULL | NULL | ... | 2168.7 |

FIG. 11

MACHINE-LEARNED PREDICTIVE MODELS AND SYSTEMS FOR DATA PREPARATION RECOMMENDATIONS

CROSS-REFERENCE TO RELATED APPLICATIONS

This application is a continuation of U.S. patent application Ser. No. 16/886,155 filed on May 28, 2020, entitled "MACHINE-LEARNED PREDICTIVE MODELS AND SYSTEMS FOR DATA PREPARATION RECOMMENDATIONS," which issued as U.S. Pat. No. 11,488,068 on Nov. 1, 2022, and which application claims the benefit of and priority to U.S. Provisional Patent Application Ser. No. 63/008,387 filed on Apr. 10, 2020 and entitled "MACHINE-LEARNED PREDICTIVE MODELS AND SYSTEMS FOR DATA PREPARATION RECOMMENDATIONS," both of which applications are expressly incorporated herein by reference in their entireties.

BACKGROUND

Computers and computing systems have affected nearly every aspect of modern living. Computers are generally involved in work, recreation, healthcare, transportation, entertainment, household management, etc.

In some situations, for example, computing systems may be used to perform data preparation and data analytics. Data scientists, for example, often use spreadsheets, tables and other data storage management software to process, clean, sort and organize large sets of data to perform data analytics and statistical analysis on the data sets.

Data preparation refers to the process of preparing raw data from disparate sources into formats that are ready for business intelligence (BI) and machine learning (ML) applications. Some entities view the data preparation step as "the most time-consuming step in analytics" in their reports. It is estimated that some business analysts and data scientists spend up to 80% of their time on data preparation. Accordingly, democratizing data prep is a prerequisite and a major roadblock to democratizing BI and ML.

Not surprisingly, there has been an increase in research and commercial efforts aiming to improve users' productivity in the data preparation process. This trend towards smart data prep is also referred to as "self-service" data preparation, as the goal is to enable non-technical end-users (e.g., in Microsoft Excel or Tableau) to be able to prepare data themselves with the help of software, without involving central IT.

Some data management and analytics software are designed to suggest data operators that are frequently invoked/used. As an example, for the "Join" operator, some systems have features to recommend likely join keys for two given input tables. Some systems are also configured to provide suggestions for "GroupBy" and "Aggregation" operations. By way of example, some systems will suggest possible GroupBy attributes once a user selects an input table and an intention to perform a GroupBy operation (e.g., when a user selects the relevant menu option associated with GroupBy).

These intelligent recommendation-based features are clearly beneficial to non-technical users and are important steps towards achieving "self-service" data preparation. However, an in-depth analysis of behaviors of these features indicates that these existing intelligent recommendations are based on heuristics (e.g., low-cardinality columns are likely good group-by columns), which do not necessarily align with a user's intentions, and such that they are not particularly relevant or useful in many circumstances.

In addition, for the far more involved operations (e.g., Pivot and Unpivot), the recommendations made by existing systems are even more limited. This is likely because of the difficulty in devising rules that work well for diverse tables based on simple heuristics.

In view of the foregoing, it will be appreciated that there is an ongoing need for improvements in the computing industry for systems that are configured for providing intelligent recommendations to non-technical users that use the systems for performing data preparation and analysis.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments generally relate to systems, methods and storage devices that are configured to facilitate data preparation recommendations and the creation and use of data preparation recommendation models for facilitating the creation and presentation of data preparation recommendations.

Some embodiments include computing systems and methods for facilitating self-service data preparation by generating machine-learned models to predict a user's next step or a specific implementation of various operators. In such embodiments, a data preparation model building computing system crawls a plurality of notebooks on third-party systems and clones them locally as notebook data. The computing system then collects ground truth from the notebook data by replaying the function invocations within the notebook data and the computing system identifies the ground truth, comprising operator data, and sequential data for each operator used within the notebook data.

The data preparation model building computing system then utilizes the ground truth to generate one or more data preparation recommendation models. In some instances, the computing system utilizes one or more machine learning components such that the data preparation recommendation model is a machine-learned predictive model. In some embodiments the computing system utilizes one or more feature-based, optimization-based, or deep-learning based components to generate the data preparation recommendation model.

Disclosed embodiments also include computing systems and methods for assisting a user with self-service data preparation by providing prompts or guides to a user to assist a user with data preparation. In such embodiments, a data preparation computing system obtains the data preparation recommendation model, which was generated by the data preparation model building computing system. The data preparation computing system also accesses a user notebook, comprising user notebook data and user input. The data preparation computing system then identifies characteristics of the user notebook data. The data preparation computing system then applies the user notebook data, user input, and characteristics of the user notebook data, to a data preparation recommendation model to generate an output.

In some instances, the data preparation recommendation model output is utilized to generate a prompt. The data preparation recommendation prompt comprises a recommended action of one or more data preparation operations on the data within the user notebook. In some instances, the data preparation recommendation prompt comprises at least one of (i) one or more desired instantiations of a specific data preparation operators or (ii) one or more desired next operators.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 2 illustrates an exemplary portion of notebook data.

FIG. 3-4 illustrate an example data-flow of notebook data.

FIG. 5 illustrates an example of a join data preparation operation.

FIG. 10 illustrates an example of a pivot data preparation operation.

FIG. 11 illustrates an undesirable output table of a pivot data preparation operation.

DETAILED DESCRIPTION

Figure 1:
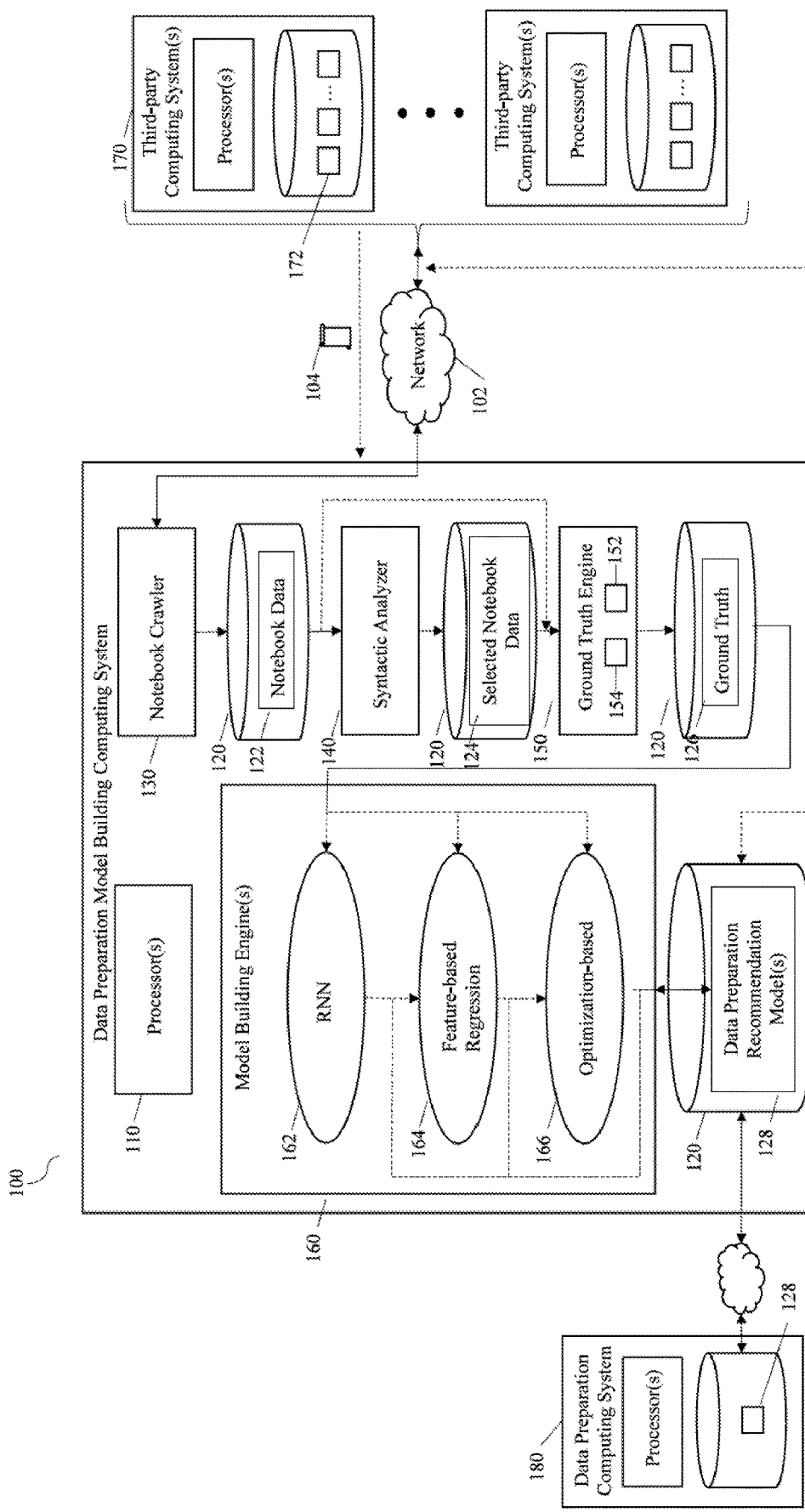
FIG. 1 illustrates a computing system architecture of a data preparation model building computing system.

The following discussion now refers to various functions and functionality associated with utilizing machine-learned models to provide recommended operations for interacting with data and for performing data preparation and analysis.

As described herein, some of the disclosed embodiments are directed towards systems and methods for generating data preparation recommendation models. These models are built and/or modified based on the analysis of ground truth obtained from notebooks and log records associated with the notebooks and the corresponding input/output tables operators used by the notebooks, as well as exact choices made by users in manipulating data within the notebooks.

In some embodiments the data preparation recommendation models are configured to provide predictive recommendations when utilized with self-service data preparation computing systems. In some instances, the predictive recommendations comprise output from a data preparation recommendation model based on characteristics of the user's notebook data and detected user input that are provided as inputs to the data preparation recommendation model. The data preparation recommendations include one or more of: (i) one or more desired instantiations of a specific operator for analyzing or processing the data of the user's notebook, or (ii) one or more desired next steps to perform in analyzing or processing the data of the user's notebook.

With regard to the foregoing and the following discussion, the term "notebook" is generally defined herein as a "data processing pipeline" or a set of "data processing steps" associated with a set of stored data and which may also be associated with user interfaces that enable a user to select and/or perform operations on the stored data. Notebooks are sometimes used by data scientists to prepare data for data analytics and/or to perform data analytics on the stored data associated with the notebooks. Non-limiting examples of notebooks used by data scientists include Jupyter notebooks and Zeppelin notebooks. In some instances, the functionality and utility of the disclosed embodiments is also applicable to other types of notebooks, such as notebooks used by data analysts like, but not limited to Power BI, Excel, and Tableau and which may include interfaces for presenting stored data to a user in various formats.

The term "input data" includes values, tables, and in some instances, user input.

The terms "features" and "signals," which are sometime used interchangeably, include attributes of the specific operator as well as characteristics of the data being manipulated by the operator, for example: data type (date, text, number, $), data formatting, and positioning (column, row, position to another column or row, etc.).

The term "operator data" may include information such as parameters of function calls, input and output tables, and return values.

The term "sequential data" should be interpreted as a sequence of operators associated with a function performed within or by a notebook. In some instances, the sequential data also includes user inputs received after a specific operator is performed.

The term "notebook data" refers to a collection of data which is obtained from one or more notebooks. Notebook data can be the entirety of a notebook, a plurality of notebooks, copies of one or more notebooks, clones of one or more notebooks, one or more portions of notebooks and comprises the input data and operator data of the portion or plurality of notebooks from which the notebook data was gathered.

The disclosed embodiments provide technical benefits by providing machine-learned predictive models for data preparation recommendation, which are based on a plurality of notebooks. Further, the disclosed embodiment enables intelligent data preparation recommendations for some data preparation operators, which are not offered by existing systems.

Technical benefits of the disclosed invention include a data-driven approach in making intelligent data preparation recommendations based on the collective wisdom of other data scientists derived from other notebooks and notebook interactions, which enable the recommendations to be made with improved probabilities of usefulness and relevance, relative to recommendations based on simple heuristics. With regard to the foregoing, experimentation has shown that the disclosed systems are able to outperform existing systems in making useful and relevant recommendations.

Additionally, the existing systems enable predictions to be made for operations that are very complex (e.g., pivot, unpivot, etc.), for which existing systems are unable to make any equivalent recommendations. As a result, the disclosed embodiments facilitate improvements in the user experiences and efficiency of data preparation by providing data preparation recommendations for a wider array of relevant operators than is currently provided by existing systems.

FIG. 1 illustrates an embodiment of computing system architecture for a data preparation model building computing system 100. The data preparation model building computing system 100 has one or more storage devices 120, which have stored computer executable instructions, which, when executed by one or more processors 110 cause the computing system to generate a data preparation recommendation model 128.

In at least one embodiment, the data preparation model building computing system 100 has a notebook crawler 130 that accesses a plurality of notebooks 172 from one or more third-party computing systems 170 through a network 102. The plurality of notebooks 172 are publicly available on one or more platforms like GitHub and can be accessed through an API, such as a GitHub API, to crawl the notebooks 172 by performing a query using the file suffix (.ipynb), for example.

In some embodiments, the notebook crawler 130 clones or copies the plurality of notebooks and/or notebook data locally, in one or more storages devices 120, as notebook data 122. During the notebook crawling process, notebook data packets 104 corresponding to the notebooks 172 and be pushed and/or pulled to from the third-party computing systems 170 to the data preparation model building computing system 100.

In at least one embodiment, the data preparation model building computing system 100 has a syntactic analyzer 140 that identifies a subset of the notebook data 122 to be used as the basis of the selected ground truth to use for building/training a particular predictive model based on certain attributes (e.g., for particular operator predictions).

Once the syntactic analyzer has identified a subset of the notebook data 122, that subset is stored on the one or more storages devices 120 as selected notebook data 124. In one embodiment, the selected notebook data 124 comprises notebooks that utilize one or more specific data preparation operators. In one embodiment, selected notebook data 124 comprises notebooks that utilize one or more relevant Pandas API calls.

It will be appreciated that inasmuch as the selected notebook data 124 is a subset of the entire notebook data 122 corpus, the use and function of the selected notebook data 124 is similar to an analysis of the larger set of notebook data 122. Therefore, any instance where the notebook data 122 is utilized or referenced within the disclosed embodiments, it will be appreciated that corresponding embodiments may utilize only the more limited subset of the selected notebook data 124.

In at least one embodiment, the data preparation model building computing system 100 includes a ground truth engine 150 which identifies the ground truth 126 from the notebook data 122 and stores the ground truth 126 in one or more storage devices 120. The ground truth 126, in some instances, comprises operator data and sequential data identified from the notebook data 122.

In some embodiments, the ground truth engine 150 replays the notebook data 122 in order to identify and collect the ground truth 126. In one embodiment the ground truth engine 150 will replay a notebook using a tool such as Python tracing library, to instrument program execution of the notebook data 122 line-by-line. Replaying the notebook data 122 enables the ground truth engine 150 to have access to call stacks for every function invocation of each data preparation operator. The ground truth engine 150 can then extract detailed information for each data preparation operator. In one non-limited example, the ground truth engine 150 may identify parameters of function calls (including input/output tables) as well as the return values associated with the function calls and operators.

Figure 2:
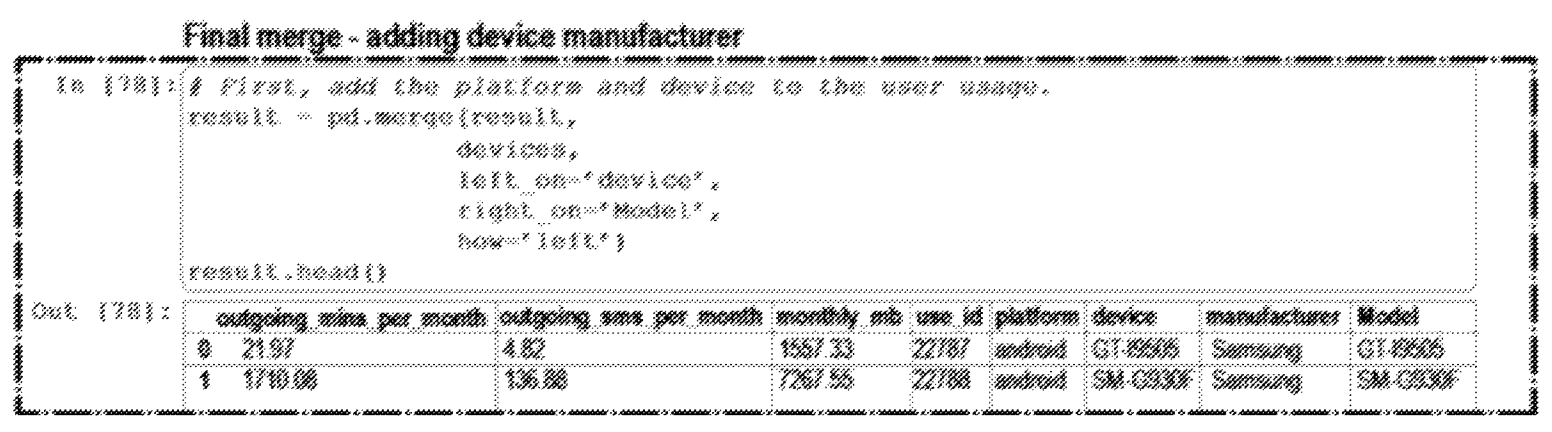

FIG. 2 illustrates a non-limiting example of the ground truth data 126 collected from notebook data 122 by the ground truth engine 150. FIG. 2 illustrates the use of the data preparation operator "join" from a notebook. From the notebook illustrated in FIG. 1, a ground truth engine 150 will log an instance of the "merge" as it is known in Pandas (e.g. a join data preparation operation). The ground truth engine 150 will also identify a full dump of the two input tables "result" and "devices." Finally, the ground truth engine 150 will also identify additional parameters recorded in this instance of the join data preparation operation, including the choices made by the user who created this notebook. For example, the ground truth engine 150 will identify that the attributes 'device' and 'model' are join keys and that the user utilized a left-outer-join. In the example illustrated in FIG. 2 the ground truth engine 150 logs five parameters that are explicitly passed into this pd.merge( ) call (including the two input tables for a join) and eight implicit parameters that use default values associated with the merge operation. In some instances, the full merge API will include more or less parameters than those shown. Other operators will be associated with the same or different parameters corresponding to the particular operators being evaluated.

In at least one embodiment, the ground truth engine 150 includes a time-out of five minutes for the execution of each cell, to ensure constant progress in instrumentation and ensures the ground truth engine 150 will be able to play a large number of notebooks.

Occasionally the execution of a cell can fail as the ground truth engine 150 is replaying notebook data 122. These cells may fail for various reasons, such as missing packages in the local environment or missing data files.

In at least one embodiment, the ground truth engine 150 includes a missing data package module 152 to resolve missing data packages. In at least one embodiment, the missing data package module 152 can parse error messages produced from the execution of a cell and identify likely names of missing package. At least one embodiment programmatically installs such dependencies automatically. In one embodiment, the missing data package module will invoke pip install PKG, where PKG is the name of the missing package identified from error messages. In at least one embodiment, the missing data package module 152 can then re-execute the failed cell until it runs successfully, or the missing data package module 152 exhausts all options to resolve the missing data package.

To resolve missing data files (e.g. .csv, .json, etc.) one embodiment of a ground truth engine 150 includes a missing data file module 154 to find missing data files. Sometimes, data files are missing because the author of a notebook may "hard-code" the absolute path of the data files in their local environment, which is not a valid pathway in the platform repo (e.g. GitHub repo) or in the data preparation model building computing system 100.

In some embodiments, the missing data file module 154 is able to locate missing data file by using various techniques.

For instance, given a file path that fails to load when executing a notebook (e.g., D:\my_project\titantic.csv), the missing data file module 154 ignores the file path and searches using the file name (titantic.csv) in the code repository, starting from the working directory.

In other instances, the computing system 100 looks for URLs that are provided in the comment or text cell adjacent to the failed code cell. The missing data file module 154 first parses the URL from the notebook data 122 and then attempts to download the missing file.

Sometimes data sets come from public data science challenges where the datasets are hosted on known third-party computing systems 170, such as Kaggle. In these instances, the missing data file module 154 attempts to resolve missing data files by searching in these known datasets and downloading the missing file. In one embodiment, the missing data file module 154 searches Kaggle Dataset API (e.g. command Kaggle datasets download –d titanic) and downloads the missing file from Kaggle.

Once the file is successfully found by the missing data file module 154, the missing data file module 154 installs the necessary pathway dependency and replays the cell until the execution is successful.

In at least one embodiment, the ground truth engine 150 identifies sequential data of each operator within the notebook data. As the ground truth engine 150 identifies operator data, it tracks of the sequence of operations within notebook data and reconstructs the data-flow.

In at least one embodiment, the ground truth engine 150 identifies detailed input and output tables within the notebook data which, in some instances comprise Pandas dataframes.

In at least one embodiment, the ground truth engine 150 records the input and output tables of seven Pandas API data preparation operation calls that either (i) take data-frame objects as parameters or (ii) produce the data-frames concat, dropna, fillna, groupby, melt, merge, or pivot.

In some embodiments, the ground truth engine 150 can record the unique hash id of each data-frame and trace input and output dependencies between data-frames to construct data-flow graphs even if dependencies are far apart in the script or data pipeline.

Figure 3:
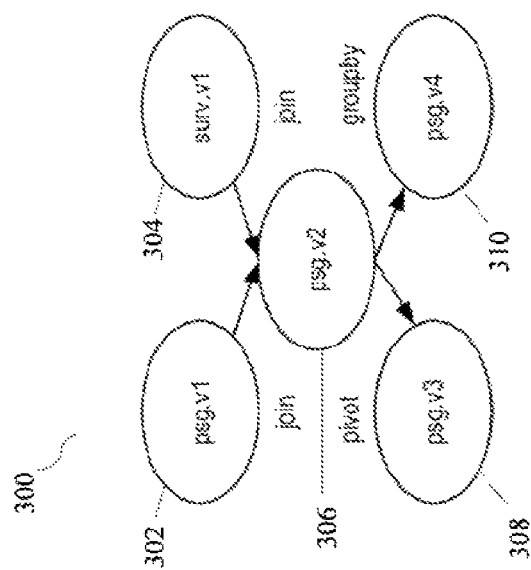

FIG. 3 illustrates an example of a data flow graph 300 for the code snippet 400, which is illustrated in FIG. 4. As shown, the data-flow graph 300 includes various nodes, where each node (302, 304, 306, 308, and 310) is a (versioned) data frame variable, and each edge is an operation, which allows the system to construct operator sequences/pipelines, in order to predict the "next operator." In this example, the code snippet 400 reads two CSV files 302, 304 into data frames before it joins the two CVS files 302, 304 and saves the result as psg 306 of the data flow graph 300. It then performs Pivot and GroupBy on psg 306 to explore the data set (known as Exploratory Data Analysis, EDA) creating two new data frames 308, 310.

In some embodiments, the data preparation model building computing system 100 has a model building engine 160 that generates one or more data preparation recommendation models 128. In this regard, it will be appreciated that the term "generates" includes the processes associated with building and/or training a data preparation recommendation model 128 based on the ground truth 126. The term generating a model can also include embodiments for obtaining a pre-existing data preparation recommendation model and further training and/or otherwise modifying the pre-existing data preparation model based on the ground truth 126 to correspond with making predictions for particular operations associated with the ground truth 126.

In some embodiments, the model building engine 160 will generate one or more data preparation recommendation model(s) to provide two types of data preparation recommendations.

In the first type of data preparation recommendation, a system detects a user's high-level intent to perform a data preparation operation (e.g., Pivot, Join, Group-by, etc.) and the disclosed embodiments predict one or more desired instantiations of the operator (e.g., how to Pivot and Join) based on the characteristics of user input data.

An "instantiation" is defined as a particular implementation of a specific operator on notebook data, which can be selected from a variety of possible implementations. In this regard, each operator may include multiple different implementations based on an operator which performs similar functionality on different data or subsets of data and/or multiple different implementations based on different functionality associated with the same operator on the same data.

In the second type of data preparation recommendation, the disclosed embodiments will exploit common temporal dependencies in operators in combination with characteristics of the data to accurately predict the likely next step.

In some embodiments, the model building engine 160 utilizes machine learning to generate machine-learned predictive models. The model building engine 160 has one or more components 162, 164, 166 to facilitate machine learning based on the ground truth 126. The components 162, 164, 166 of the one or more model building engine(s) 160 include one or more feature-based components 164, one or more optimization-based components 166, and one or more deep-learning based component(s) 162. In some embodiments, the model building engine components 162, 164, 166 are utilized individually or in combination by the model building engine 160 to build one or more data preparation recommendation models 128.

In some embodiments, the model building engine 160 utilizes different components 162, 164, 166 or different combinations of components 162, 164, 166 to build different data preparation recommendation models. For example, in one embodiment, the model building engine builds different data preparation recommendation model 128 for each data preparation operator. In at least one embodiment, the model building engine 160 uses different components 162, 164, 166 for each data preparation recommendation model 128 which is built for a specific data preparation operation.

For example, in one embodiment, the model building engine 160 will generate a data preparation recommendation model 128 for the data preparation operator "join" and will utilize only a feature-based regression component 164. Conversely, in another embodiment, the model building engine 160 will generate a data preparation recommendation model 128 for the data preparation operator "pivot" and will utilize both a feature-based component 164 and an optimization-based component 166. More specifics on the different possible configurations of model building engines 160 are disclosed below.

In some embodiments, the model building engine 160 generates different data preparation recommendation models 128 for different types of data preparation recommendations. For example, in one embodiment, the model building engine 160 generates one or more models 128 for a single operator predictor model (an instantiation of a specific operator) and one or more data preparation recommendation models 128 for a likely next step predictor model.

In at least one embodiment, the model building engine 160 uses different components 162, 164, 166 for each data preparation recommendation model 128, which is built for different types of data preparation recommendations. For example, in one embodiment, the model building engine 160 will generate a data preparation recommendation model 128 for an instantiation of a specific operator and the model building engine 160 will utilize one or more feature-based components 164 and one or more optimization-based 166 components. In another embodiment, the model building engine 160 will generate a data preparation recommendation model 128 for prediction of the likely next step based on the sequential dependency of that operator within the sequence of operators in a data pipeline. In this case, the model building engine 160 will utilize a deep-learning component 162 individually or in combination with other components.

Now turning to more detailed disclosure of various different embodiments of model building engines 160, it is noted that disclosed embodiments include model building engines 160 that are configured to generate one or more data preparation recommendation models 128 for the five most common data preparation operators: join, groupby, normalize-json, as well as complex operators like pivot and unpivot. As described herein, these models are able to predict and suggest different types of data preparation recommendations, including a desired instantiation of a specific operator and/or a desired next step in performing data preparation or data analysis.

It will be appreciated that the following examples are non-limiting and that the components 162, 164, 166 of model building engines 160 may be utilized in any configuration, including configurations of model building engines 160 for any data preparation operator or type of data preparation recommendation.

Join Model Building Engine

Some specific examples and details regarding a join model building engine, which is one example of the aforementioned model building engines 160, will now be provided.

A join data preparation operator is used when a user wants to combine two or more data tables. For a data preparation recommendation model 128 to properly predict an instantiation of a join data preparation operator, there are two essential prediction tasks. First, the data preparation recommendation model 128 must predict a pair of columns within notebook data as join columns. In other words, the first predictions task is to predict which columns should be used as join keys. The second prediction task is to predict the join type, for example, inner/left-outer/right-outer/full-outer-join, etc. Differences between the instantiations of the join operator are somewhat subtle and not obvious to non-technical users, therefore accurate predictions are beneficial to improve efficiency and productivity of the user.

Given two tables T and T', with columns $\{C1, \ldots, Cn\} \in T$ and $\{C1', \ldots, Cm'\} \in T'$, the problem of a join operator is to predict which pair of columns (S, S') are likely join columns, with $S \subseteq T$, $S' \subseteq T'$ and $|S|=|S'|$. In some embodiments, the pair of columns can include single columns or multiple columns. The model building engine 160 will consider each pair of columns (S,S') as a candidate join columns. In some embodiments, the model building engine 160 utilizes efficient filters to identify columns which are highly unlikely candidates for the join operation and prunes these columns from the candidate join columns. In this embodiment, the prunes columns are not considered as possible join columns with the candidate join columns.

At least one embodiment models the most likely join columns with point-wise ranking to produce a ranked list of candidates. In at least one embodiment, the model building engine 160 uses one or more feature-based machine learning components 164 which evaluates features of the notebook data. These features were developed to collectively predict join columns. The features empirically shown to be important to accurately predicting the join columns include the following:

Distinct-value-ratio of S and S': Defined as the ratio of distinct tuples in S and S', over total number of rows. In most cases, at least one of S and S' should be key columns with distinct-value-ratio close to 1.

Value-overlap of S and S': Measured as Jaccard-similarity, as well as Jaccard-containment in both directions. Pairs with higher overlap are likely to be join columns.

Col-value-types: Column types can be string vs. integer vs. float, etc. In general, two string columns with high overlap are more likely to be join columns, whereas the confidence is lower for integer columns (e.g., the columns in dashed boxes in FIG. 6).

Left-ness: Columns to the left of tables are generally more likely to be join columns, so positions of S (resp. S') within T (resp. T'), in both absolute terms (e.g., the 2nd column from the left), and relative terms (e.g., 2nd column out of 20 total cols is 2/20=10%).

Sorted-ness: Whether values in S and S' are sorted, where sorted columns are more likely to be key columns and participate in joins.

General table statistics: These include statistics of input tables such as number of rows, columns, empty cells, etc.

Figure 5:
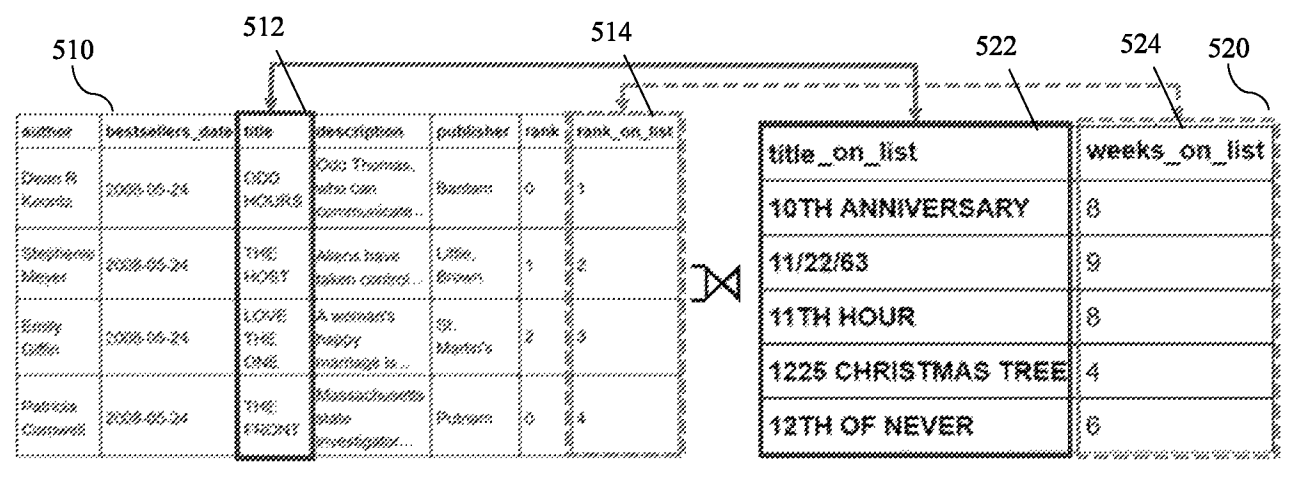

FIG. 5 illustrates an example of two tables that a user may wish to combine. In particular, table 510 has a list of best-selling books and table 520 has historical information about these books. In some instances, the data preparation model building computing system was able to analyze data from many different notebooks with similar tables to tables 510 and 520 to determine that data scientists using those notebooks would often choose to left-outer-join using the columns "title" 512 and "title_on_list" 522. The system can then use this information to build ground truth for making predictions about recommendations for operations to be performed on similar tables (like 510 and 522) which can be presented to a user.

Existing commercial systems tend to pick the incorrect pair: "rank_on_list" 514, and "weeks_on_list" 524, shown in the dotted boxes. This incorrect choice by existing systems is based on value-overlap and because "rank_on_list" 514 appears to be a join key. Value-overlap is a measure of comparing columns on two tables and finding column pairs which contain similar values. For example, since the values in the column "weeks_on_list" 524 are fully contained within the values in the column "rank_on_list" 514 there is a high value-overlap between these columns. Existing systems which depend on heuristics, such as these, are limited in their ability to accurately predict useful instantiations for users. For instance, it is likely that a join which combines "week_on_list" 524 and "rank_on_list" 514 will be entirely irrelevant and useful to the user.

In comparison, a data preparation recommendation model 128 trained on a large collection of real data (e.g. the ground truth 126) considers a combination of signals and features to more accurately predict a more relevant and useful join, such as by predicting the "title" and "title_on_list" as the suggested join columns. For example, disclosed data preparation recommendation models 128 consider features such as the column "title" is more to the left of the tables and "title" is a string column where value overlap is reliable. Details of these important features, which are included in the identified ground truth used to build/train the predictive model, are discussed above.

The second task of a join data preparation recommendation model 128 is to is to correctly predict join types, given tables T and T' and join-columns (S, S'). At least one embodiment uses a feature-based regression component 164 with features used in the first prediction task (e.g. the join column prediction), to generate and train a point-wise ranking data preparation recommendation model 128 to improve the accuracy of predictions for join type.

Existing commercial systems default to inner-join, which is likely based on this type of join being the most common join-type, accounting for approximately 78% of join instances. However, a join prediction based on this simple heuristic leaves much room for improvement. For example, oftentimes given two input tables, the larger table (with more rows/columns) tends to be the "central" table of interest, and the smaller one tends to be used to enrich the central table. Yet, it is possible that even if a fraction of the rows in the central table do not join with the smaller table, users will still want to preserve all rows in the central table by using outer-join. In these instances, the default inner-join choice of existing systems would remove these rows and would not be an accurate prediction.

Disclosed embodiments utilize feature-based components 164 to generate machine-learned predictive data preparation recommendation models that are able to substantially outperform the baselines of existing commercial systems in making relevant/useful recommendations for data preparation operations.

GroupBy/Aggregation Model Building Engine

Some specific examples and details regarding a GroupBy/Aggregation model building engine, which is one example of the aforementioned model building engines 160, will now be provided.

GroupBy/Aggregation are common data preparation operators. Given a table T, and columns {Ci}∈T, the prediction task for this model is to predict columns that are likely GroupBy and Aggregation columns.

At least one disclosed embodiment uses features to describe each column C∈T and uses one or more feature-based components 164 within a model building engine 160 to generate data preparation recommendation models 128 to improve the accuracy (e.g., relevance and usefulness) of a groupby recommendation. In at least one embodiment, the feature-based component 164 utilizes one or more of the following features for each column C prediction/analysis:

Distinct-value-count: This is the number of distinct values in C. GroupBy columns typically have a small cardinality.

Distinct-value-ratio: This is the number of distinct values in C divided by the number of rows in T. Columns with smaller Distinct-value-ratio are likely GroupBy columns.

Column-data-type: String vs. int vs. float, etc. String columns are more likely used in GroupBy, whereas float is more likely used in Aggregation.

Column-position: Columns to the left of a table are more likely GroupBy columns and ones to the right are more likely to be metric columns for Aggregation.

Column-names: Given the name of a column C, the system assesses how often this name is used as GroupBy vs. Aggregation and use the corresponding counts as features. This allows us to capture common names of GroupBy columns (e.g., "company", "gender", etc.) versus Aggregation columns (e.g., "revenue").

Existing systems provide a list of "GroupBy-Recommendations" when user input is detected which indicates a high-level desire to groupby. These systems are useful because users typically have some idea of the desired GroupBy results (e.g. a table which displays revenue by company and by year). Instead of requiring users to browse a large amount of raw data a user can look at a simplified list of suggested groupby and aggregation options to quickly locate relevant ones and produce desired GroupBy results. However, existing systems produce a the GroupBy recommendation list based on heuristics, which have limited accuracy. Therefore, improvement is needed to increase user efficiency and improve the user experience by presenting a list of accurate data preparation operations, including in some instances, accurate groupby recommendations. The embodiments described herein help facilitate the performance of many operations and accuracy of performing the actions operations, such as, for example, in providing a list of groupby and aggregation columns to a user.

Figure 6:
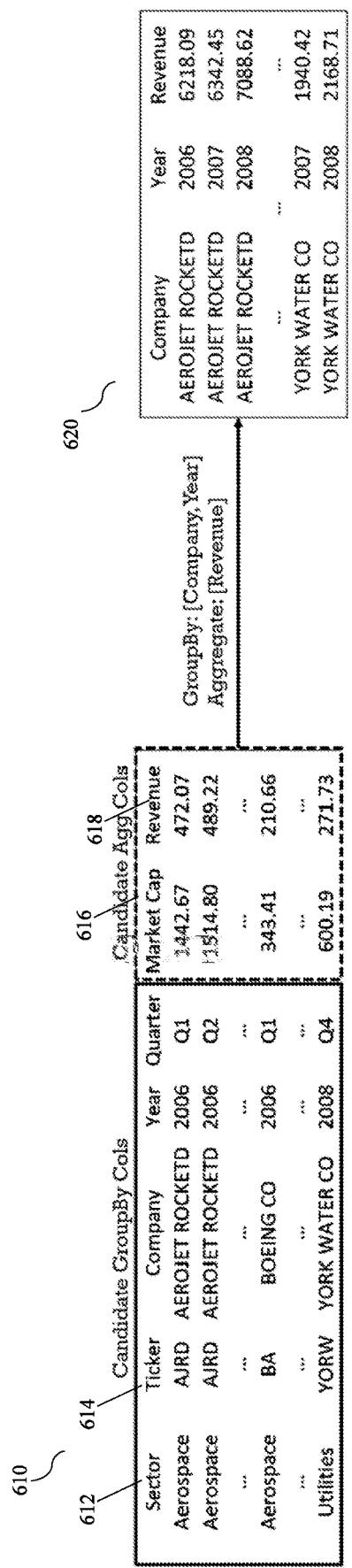
FIG. 6 illustrates an example of a group by data preparation operation.

FIG. 6 shows an example of presenting a groupby/aggregation prediction. The data preparation recommendation model 128 recognizes that any of the columns in the solid box ("Sector" 612, "Ticker" 614, etc.) can all be used as valid GroupBy columns (also known as dimension columns), while columns in the dashed box ("Market Cap" 616 and "Revenue" 618) can be used for aggregation (also known as measure columns). In one embodiment, a user would be presented in their notebook interface with various groupby recommendations predicted by the corresponding model and which utilize the predicted dimension columns 612, 614 and measure columns 616, 618 for the resulting output table. For example, table 620 shows an output table which is an instance of the data preparation operation on the input table 610 using groupby on "Company" and "Year" and aggregation on "Revenue".

Normalize/Flatten Json Model Building Engine

Some specific examples and details regarding a Normalize/Flatten Json model building engine, which is one example of the aforementioned model building engines 160, will now be provided.

Json is a popular file format for data exchange, and often the starting point of data analysis. Users frequently want to load/flatten/normalize Json into a tabular format for downstream processing. For example, Pandas provides the API "json_normalize" for users to flatten array-structured Json into tables. Due to its nested architecture of a json and the difficulty of inspecting large Json files, normalizing json into tabular form can be difficult for less sophisticated end-users.

Therefore, there is need for improvement to enable less sophisticated end-users to ability to successfully utilize a normalize-json efficiently and accurately.

Figure 7:
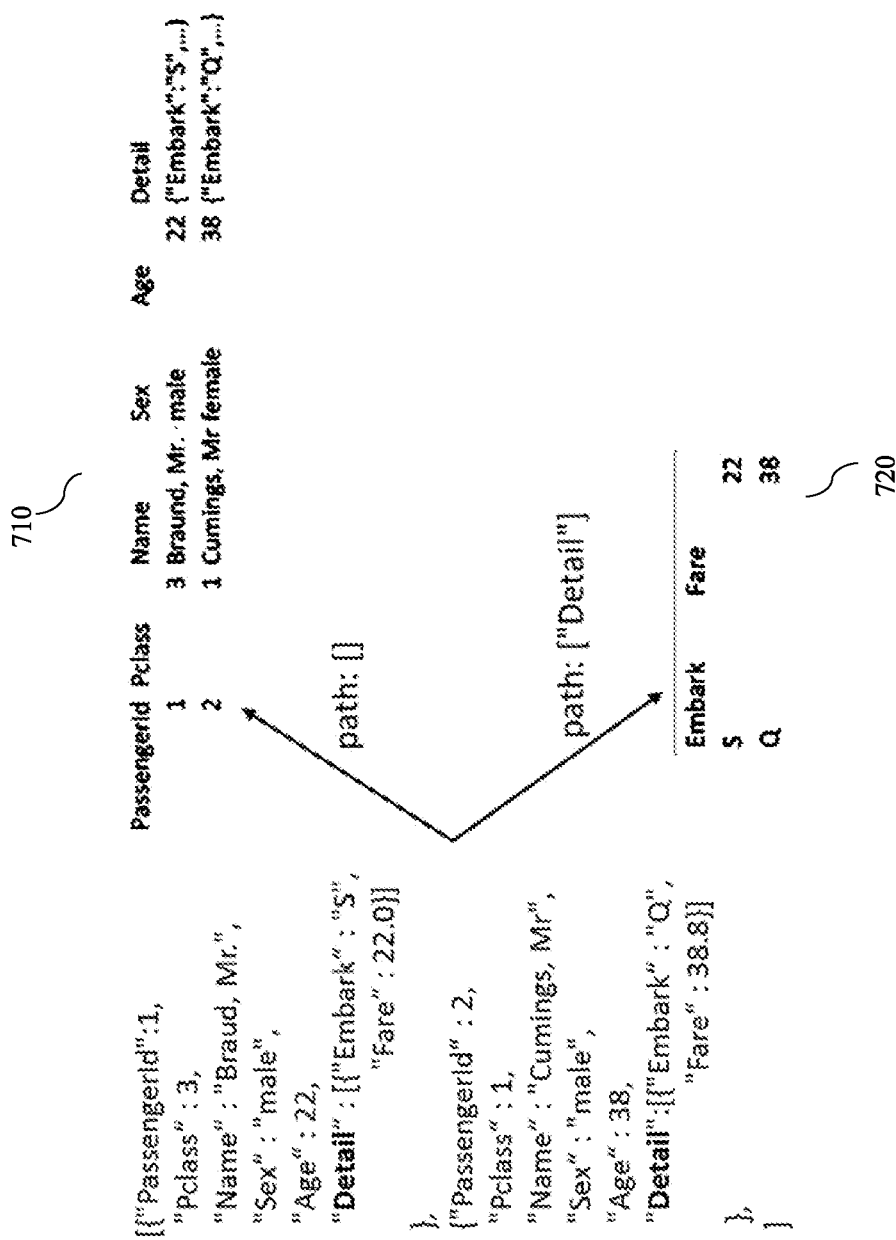
FIG. 7 illustrates an example of a normalize-json data preparation operation.

FIG. 7 shows an example Json document with two levels of nested arrays, which correspond to two choices for normalize-json. The first choice is to normalize the array at the root level shown as table 710 or under key "detail" which would produce table 720.

The key prediction task of this data preparation recommendation model is to decide which json level is likely the target of normalization among the multi-level nested arrays. Note that the task is not trivial because over 80% of the json inputs have more than one possible path, where the average json has 4.1 paths per document. In at least one embodiment, one or more model building engines 160 utilizes a feature-based machine learning component 164 to generate a data preparation recommendation model 128 for normalize-json. In one embodiment the feature-based component utilizes point-wise ranking and features extracted from each json candidate path for normalization. The following features are example features that may be considered for and by the model:

Path-depth: This is defined as the depth of the path, counting from the root. For example, in FIG. 7 the depth of the two choices are 0 for table 710 and 1 for table 720. Intuitively, paths closer to root are more likely to be selected for Unpivot.

Num-rows/columns/cells: The number of rows/columns/cells from resulting normalized tables intuitively captures the amount of information or "usefulness" of the normalization. For example, in FIG. 7, the root path produces a table with more columns, which is likely more desirable than the alternative that has only two columns.

Emptiness-ratio: Defined as the fraction of empty cells in a normalized table. This is useful because in some cases, array elements under the same path do not align in the same relational schema. Such normalization is likely undesirable.

Existing systems require users to inspect large Json documents and specify parameters according to an API. This leaves much room for improvement in making predictions that can facilitate the ease in making Json operations to thereby reduce the work by the end users.

At least one embodiment utilizes a data preparation recommendation model 128 to accurately predict how users want to normalize Json. In some embodiments, the data preparation recommendation model 128 is capable of producing a ranked list of likely desired normalized tables, which users can preview within a data preparation computing system and select the desired instantiation. The embodiments described herein help facilitate the performance of many operations and the ease in performing the operations, such as, for example, the use of a json_normalize to convert a json into tabular form.

Pivot Model Building Engine

Some specific examples and details regarding a pivot model building engine, which is one example of the aforementioned model building engines 160, will now be provided.

Pivot data preparation operations are common in data analytics and natively supported by database vendors, as well as end-user tools (e.g. Microsoft Excel and many others). Despite their popularity, pivots are actually quite difficult to get right. Four parameters are required to properly configure a pivot-table: index, header, aggregation-function, and aggregation-columns.

Figure 8:
FIG. 8 illustrates a user interface wizard for a pivot operation from an existing system.

FIG. 8 illustrates one non-limiting example of a Wizard from an existing system that a user may use to define the foregoing four parameters, which often use terminologies alien to end-users, and typically take a user multiple attempts to get the pivot right. Therefore, there is an ongoing need for improved tools and systems that facilitate the performing of data operations with notebooks and to generally improve the end-user experience. The embodiments described herein help facilitate the performance of many operations and the ease in performing the operations, such as, for example, the creating of pivot-tables for end-users, by recommending pivots that are the most likely instantiations.

In order for the data preparation recommendation model 128 to accurately predict the four parameters for pivot-tables, there are multiple prediction tasks required. The first prediction task is to accurately predict which columns are most likely index/header columns or dimension columns. The second prediction task is to automatically identify which of the dimension columns are a header and which are an index.

The first prediction task is similar to groupby prediction. For example, predicting the aggregation-column for a pivot is similar to predicting the aggregation in groupby (both are measures); and predicting index and header columns for a pivot is similar to predicting groupby-columns (both are dimension). In some embodiments the methods and models of a groupby operation are similar to the methods and models of the first pivot prediction task.

Figure 9:
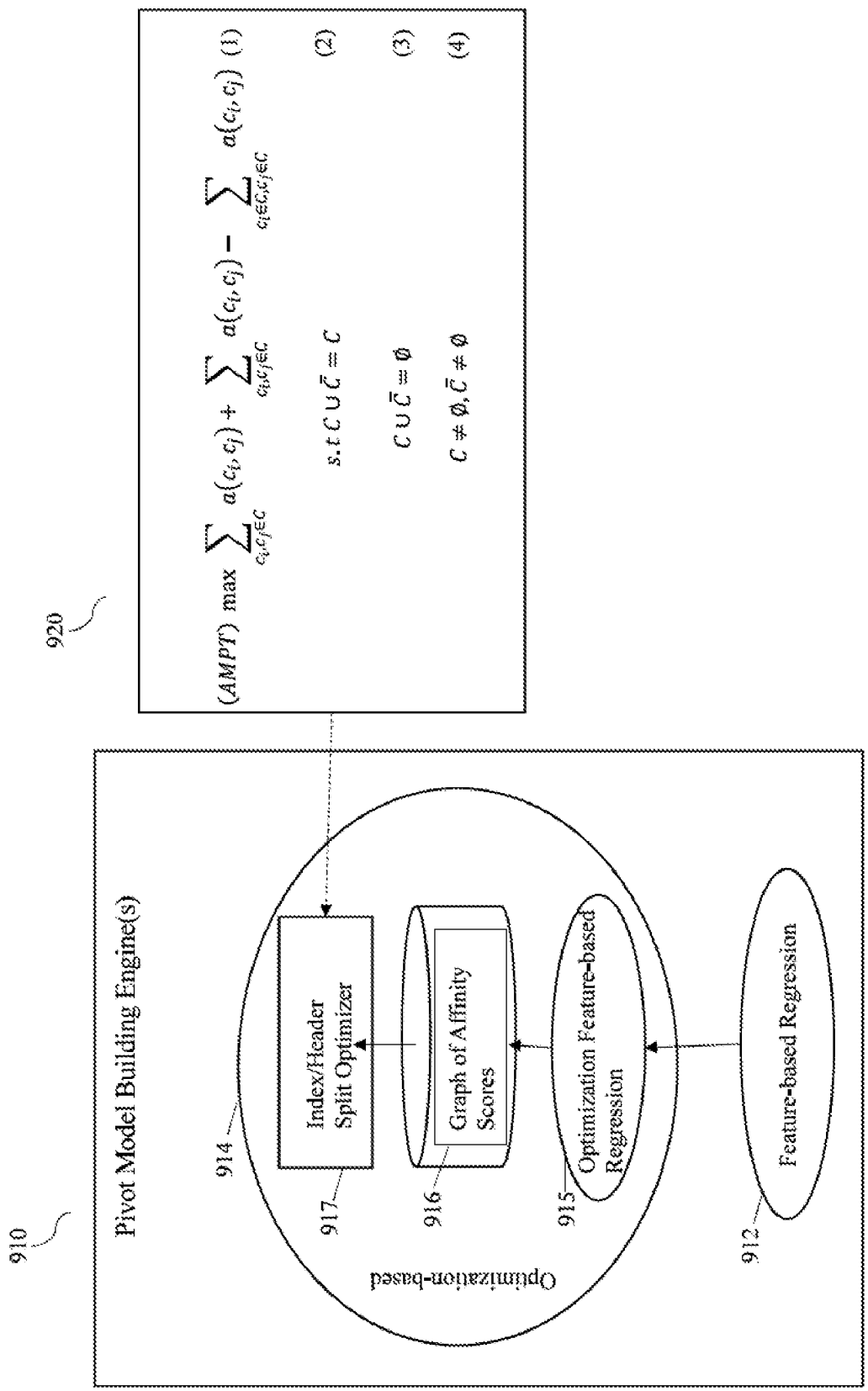
FIG. 9 illustrates a configuration of a pivot model building engine.

FIG. 9 illustrates one embodiment of a pivot model building engine 910. In this example, the first component of the pivot model building engine 910 is a feature-based regression component 912 that utilizes selected features to yield an accurate prediction of index and header columns for the resulting pivot table.

In one embodiment, the feature-based regression component 912 utilizes features similar to those disclosed in the foregoing for groupby/aggregation model building engines 160 and leverages the data preparation recommendation models 128 which were generated for the groupby/aggregation operators where the predictions of the groupby/aggregation data preparation recommendation models are modified to perform the first task of the pivot predictions. In particular, the groupby/aggregation data preparation recommendation model predictions are used, in this instance, to predict the dimension columns and measure columns of the pivot.

The second prediction task of a pivot data preparation recommendation model is to automatically identify a "good" arrangement of these dimension columns into index vs. header. In other words, the second prediction task "splits" the dimension columns identified in the first task into either header or index columns.

FIG. 10 illustrates an example input table 1010 that a user may want to perform a pivot data operation on and which can be used to create the pivot-table 2020 in order to better understand trends in the data of table 1010.

The table of FIG. 10, in combination with the pivot table of FIG. 11, are provided to illustrate some of the problems associated with splitting dimension columns into index/headers and how the disclosed models can be used for predictions associated with this task.

For instance, in this example, a first prediction task is associated with identified the columns "Sector," "Ticker," "Company," and "Year" as dimension columns, which is to say that these columns could be arranged as either the index or the header in the resulting output table. Since because the four-dimension columns can either be arranged as index (on the left) or header (on the top), there are a total of sixteen possible pivots. However, many of these arrangements are not ideal.

FIG. 11 shows the resulting pivot table of one undesirable arrangement of the dimension columns resulting from a pivot performed on the example input table 1010 of FIG. 10. Observe that since columns "Company," "Ticker," and "Year" are selected as index columns, while "Sector" was selected as a header the resulting pivot table has a large number of "NULL" entries. This is a result of a strong dependency between the columns "Sector" and "Company." In other words, because there is a strong affinity between the columns "Sector" and "Company" a pivot which splits these columns results in a large quantity if null entries. Bad pivots which split columns with strong affinity, are highly unlikely to be selected by data scientists or in collected data. Therefore, a data preparation recommendation model which can successfully eliminate these undesirable arrangements will more accurately predict the user's desired instantiation of a pivot table.

In order to make a successful prediction for the index/header split, which is likely useful and relevant, given a set of dimension columns C={Ci}, the predicted split must be quantified considering a number of factors (i.e. minimizing emptiness). Once the split is quantified, system then performs the second prediction task, which is an optimization. The pivot model building engine 810 utilizes an optimization-based component 914 to build/train a data preparation recommendation model 128 for performing the optimization associated with the second prediction task.

In at least one embodiment, the first step of the optimization is illustrated as an optimization feature-based component 915 in FIG. 9, which utilizes the ground truth 126 and pair-wise regression to "learn" an affinity score between a pair of columns Ci,Cj. The affinity score models how likely a pair of columns should be on the same side (both as index or header). The optimization feature-based component 915 uses various features, including one or more of the following features to learn the affinity score of each pair of columns:

Emptiness-reduction-ratio: This ratio is defined as $$\frac{|\{u \mid u \in T(Ci,)\}||\{v \mid v \in T(Cj)\}|}{|\{(u, v) \mid (u, v) \in T(Ci, Cj)\}|},$$

where T(C) denotes values in column C∈ T. This ratio shows how much emptiness can be "saved" multiplicatively by arranging Ci and Cj on the same side (e.g., FIG. 10 has 20 sectors and 1000 companies, so the reduction-ratio for Sector and Company is $$\frac{20 * 1000}{1000} = 20,$$

which is significant. However, the reduction-ratio between Year and Sector is $$\frac{3 * 20}{60} = 1,$$

indicating no savings). Attributes with higher reduction-ratio should ideally be arranged on the same side to reduce emptiness of the resulting pivot.

Column-position-difference: This is the relative difference of positions between Ci and Cj in T. It has been observed that columns that are close to each other in T are likely to be more semantically related (e.g., "Ticker" and "Company" in FIG. 10), and likely on the same side in pivot.

In at least one embodiment, the optimization feature-based component 915 labels pairs of columns from pivot-tables in the ground truth 126 with an affinity score of either 1 or −1. For instance, all pairs of columns on the same side of pivot tables are assigned an affinity-score of 1 (indicating both columns are index or both columns are header). While pairs of columns on different sides of the pivot tables are assigned an affinity-score of −1 (indicating one column in the pair was an index and one column was a header).

Once the optimization feature-based regression 915 learns an affinity score between each possible pair of columns, the optimization feature-based regression component 915 produces a graph of the affinity scores 916.

Figure 12:
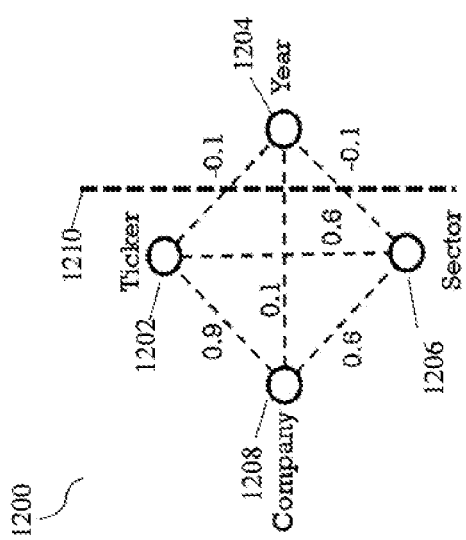
FIG. 12 illustrates a graph of affinity scores produced by a pivot model building engine.

FIG. 12 illustrates an example of the graph 1200 produced by the optimization feature-based component 915. Each node 1202, 1204, 1206, and 1208 represents a possible header or index column and each edge between nodes illustrates the affinity score between each column pair. In this example, "Company" 1208 and "Ticker" 1202 have a high affinity-score (0.9) because of the high emptiness-reduction-ratio. Similarly, the column pair "Ticker" 1202 and "Sector" 1206 and the column pair "Company" 1208 and "Sector" 1206 have a high affinity-scores (0.6), because of emptiness-ratios. In contrast, "Year" 1204 and other attributes have low affinity-scores (0.1 or −0.1), because of poor emptiness-reduction-ratios and the relative column-positions are distanced in the input table 1010 in FIG. 10.

Given the graph 1200 of affinity-scores illustrated in FIG. 12, the "goodness" of a split is quantified and can be optimized to find the optimal split. In at least one embodiment, an index/header split optimizer 917 applies the affinity-maximizing pivot-table (AMPT) formulas 920 to the graph of the affinity scores 916 to determine an optimal split for the index columns and the header columns. This split is illustrated in FIG. 12 by the dotted line 1210.

Now, attention will now be directed to a more detailed description of an example formula that can be used by the index/header split optimizer 917. In this example, the term C is the set of dimension columns. Intuitively, C will be partitioned into C and $\overline{C}$, such that the intra-partition pair-wise affinity-scores are maximized (indicating that these columns are similar), while inter-partition pairwise affinity-scores are minimized (for columns that are dissimilar). In such an example, an optimization formula/problem called AMPT (affinity-maximizing pivot-table) is provided as follows:

$$(AMPT) \max \sum_{c_i, c_j \in C} a(c_i, c_j) + \sum_{c_i, c_j \in \overline{C}} a(c_i, c_j) - \sum_{c_i \in C, c_j \in \overline{C}} a(c_i, c_j) \quad (1)$$

$$s.t. C \cup \overline{C} = C \quad (2)$$

$$C \cup \overline{C} = \emptyset \quad (3)$$

$$C \neq \emptyset, \overline{C} \neq \emptyset \quad (4)$$

The constraints in Equation (2), (3), and (4) ensure that the two partitions C and $\overline{C}$ fully covers C, are disjoint, and are non-empty, respectively. The AMPT problem above can be solved optimally in time polynomial to the number of columns in input table T. It can be shown that this problem reduces to two-way graph cut, which can be solved in polynomial time using Stoer-Wagner algorithm.

Utilizing this embodiment, the optimization-based component 914 determines that the optimal split 1210 of the graph illustrated in FIG. 12 is to split "Year" from the remaining dimension columns. The intra-partition affinity scores for "Company," "Ticker," and "Sector" is (0.9+0.6+0.6)=2.1. While the intra-partition affinity score for "Year" is 0 (since it is a singleton with no edge) and the inter-partition affinity score is (−0.1−0.1+0.1)=−0.1. Overall, the objective function is 2.1+0−(−0.1)=2.2, which is the maximum possible result from the graph in FIG. 12.

So far, only the bi-section of C in the AMPT has been considered without considering which column is index and which column is header, because the index and header are symmetric under a simple transpose. In one embodiment, such as reporting/dash-boarding scenarios, the index and header may not always be symmetric, as there may be additional constraints imposed by the user interface (UI). For example, a dashboard may often limit the width of the UI (no scrolling right), while the length may be unconstrained (can scroll down). Such scenarios can translate into a constrained version of AMPT, which called C-AMPT.

$$(C-AMPT)\max \sum_{c_i,c_j \in C} a(c_i,c_j) + \sum_{c_i,c_j \in \overline{C}} a(c_i,c_j) - \sum_{c_i \in C, c_j \in \overline{C}} a(c_i,c_j) \quad (5)$$

$$s.t. C \cup \overline{C} = C \quad (6)$$

$$C \cup \overline{C} = \emptyset \quad (7)$$

$$C \neq \emptyset, \overline{C} \neq \emptyset \quad (8)$$

$$\left| \prod_C (T) \right| \leq W \quad (9)$$

Where W is the width limit, and |ΠC(T)| is the number of distinct values in the projection of T onto C (which is essentially the number of entries required to display all distinct values in C). It can be shown that C-AMPT is NP-complete using a reduction from Cardinality-constrained Min-Cut.

The C-AMPT problem is strongly NP-complete, even if edge have 0/1 unit-weights. The size/cardinality constraint imposed in C-AMPT introduces computational hardness beyond the unconstrained version AMPT.

Since there are no known size limits of pivots in notebooks, at least one embodiment solves the general AMPT problem optimally and compares against the ground-truth (the pivot selected by data-scientists). In at least one embodiment, more than one best option could be produced from AMPT resulting in a ranked list of recommended pivots for users to preview and select.

Unpivot Model Building Engine

Some specific examples and details regarding an unpivot model building engine, which is one example of the aforementioned model building engines 160, will now be provided.

The unpivot operation, which is the inverse data operation of pivot, shapes a two-dimensional pivot-table back to a tabular form. In Pandas, the melt function implements Unpivot. The prediction task of the unpivot model built by the unpivot model building engine is to predict the unpivot columns given a table T.

Figure 13:
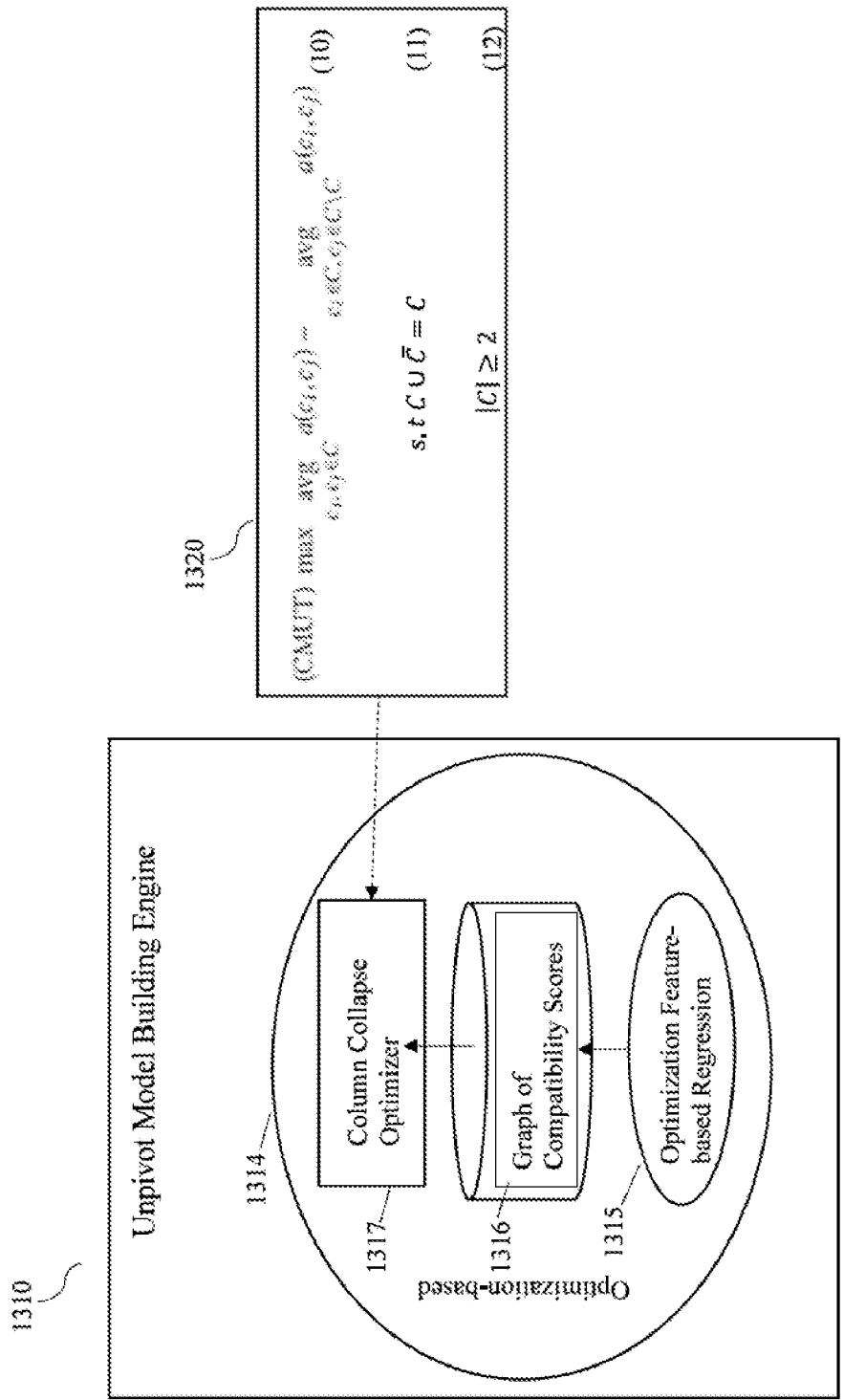
FIG. 13 illustrates a configuration of an unpivot model building engine.

FIG. 13 illustrates an unpivot model building engine. In at least one embodiment, an unpivot model building engine 1310 utilizes an optimization-based component 1314. The first step within the optimization-based component 1314 is to generate a compatibility score for each pair of columns within the input table (Ci, Cj). This is accomplished with an optimization feature-based component 1315 that utilizes regression and features similar to the features disclosed in the pivot model building engine 910 optimization-based component 914 (e.g. Emptiness-reduction-ratio, Column-position-difference).

Figure 14:
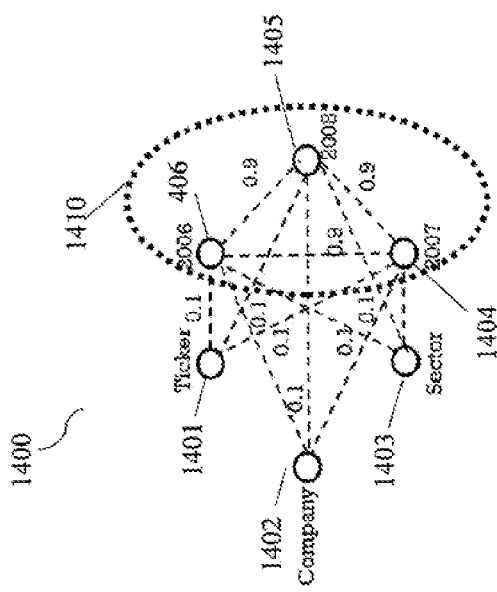
FIG. 14 illustrates a graph of compatibility scores produced by a unpivot model building engine.

FIG. 14 illustrates a graph of compatibility scores 1400 that is the product of the optimization feature-based component 1315. Each node 1401, 1402, 1403, 1404, 1405, 1406 corresponds to a column of the input table, and weighted edges illustrates the compatibility score between columns. Note that to differentiate with pivot term "compatibility score" is used to describe the relationship of each pair of columns because in an unpivot data operation, the selected columns are collapsed into a single column requires the selected columns to be compatible.

Figure 15:
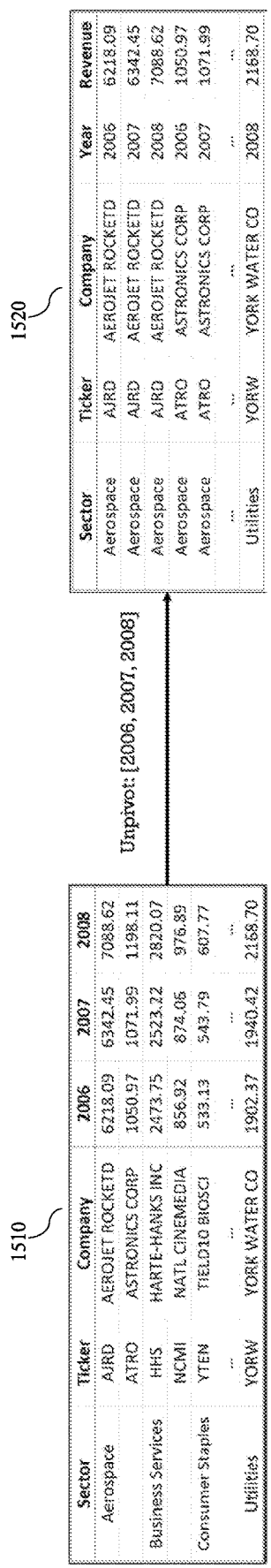
FIG. 15 illustrates an example of an unpivot data preparation operation.

FIG. 15 shows such an example of an unpivot data operation which is essentially the inverse of the pivot data preparation operation of FIG. 10. The unpivot data operation example illustrated in FIG. 15 collapses the columns "2006," "2007," and "2008" from the input table 1510 to a single data column in table 1520

The unpivot model can address the problem of finding compatible unpivot columns as an optimization problem using compatibility scores. Once the graph of compatibility scores 1516 has been produced, it is applied to the column collapse optimizer 1517 to determine the which columns which will be collapsed during unpivot. The column collapse optimizer 1517 utilizes the compatibility-maximizing unpivot-table (CMUT) formulas shown in 1520.

Now, attention will be directed to a more detailed description of the CMUT formulas 1520 used by the column collapse optimizer 1517. Unlike the case of pivot, which requires symmetric index and header each with strong internal affinity, with an unpivot operation the only concern is the compatibility of columns selected to collapse (e.g., "2007," "2008," "2009"). The compatibility of remaining unselected columns is inconsequential. As such, the CMUT problem is formulated to maximize compatibility within the group of columns selected, while minimizing the compatibility between the columns selected and not selected.

$$CMUT \max \operatorname*{avg}_{c_i,c_j \in C} a(c_i,c_j) - \operatorname*{avg}_{c_i \in C, c_j \in C \cap \overline{C}} a(c_i,c_j) \quad (10)$$

$$s.t. C \cup \overline{C} = C \quad (11)$$

$$|C| \geq 2 \quad (12)$$

Note that Equation 10 of the CMUT is different from Equation 1 of the AMPT in two ways. First, it has two terms as opposed to three, since it does not include scores for columns not selected for Unpivot. Second, it uses average scores as opposed to sum, because sum would allow an undue bias towards large clusters in CMUT (which is not an issue in AMPT).

In some instances, it has been shown that solving CMUT is hard using a reduction from Densest Subgraph. To address this difficulty, the CMUT can be solved using a greedy algorithm. For instance, in at least one embodiment, the system initializes the set of selected nodes C as the pair of nodes with maximum compatibility score and compute the corresponding objective-function in Equation (10). Then, in each subsequent iteration, the embodiment greedily finds the node having the maximum compatibility with the current C, merges it into C, and computes the resulting objective-function. The algorithm terminates when all columns are merged into C, at which point the step with the highest objective-function is selected as the result.

The foregoing can be illustrated, for example, given the graph of compatibility scores 1400 from FIG. 14, which is a graph of the compatibility scores of the input table 1510 of FIG. 15. In this example, the greedy algorithm starts with the pair of nodes with the highest compatibility. Suppose the first pair picked is "2007" and "2008" (ties are broken arbitrarily). The average intra-group compatibility of this initial group is $$\frac{0.9 + 0.9}{2} = 0.9$$

and the average compatibility score of all edges crossing the cut is as $$\frac{0.1 * 6 + 0.9 * 2}{8} = 0.3.$$

So, the objective function for this step is (0.9−0.3)=0.6. This is followed by another iteration, by finding the node with the highest compatibility with the selected group, which is "2006", and merging it with "2007" and "2008". The resulting objective function can be evaluated as $$\frac{0.9 + 0.9 + 0.9}{3} - \frac{0.1 * 6}{6} = 0.8,$$

which is higher than the previous iteration, and which is indeed a more desirable set for unpivot. Iterations continue until no further groups can produce a score higher than 0.8. As a result, the system predicts columns "2007", "2008", "2009" to be the Unpivot columns. In such instances, the predicted columns can be highlighted and presented to the user and/or results of using the predicted columns can be presented to the user to select from.

Sequential Operator Model Building Engine

Some specific examples and details regarding a sequential operator model building engine, which is one example of the aforementioned model building engines 160, will now be provided.

Figure 16:
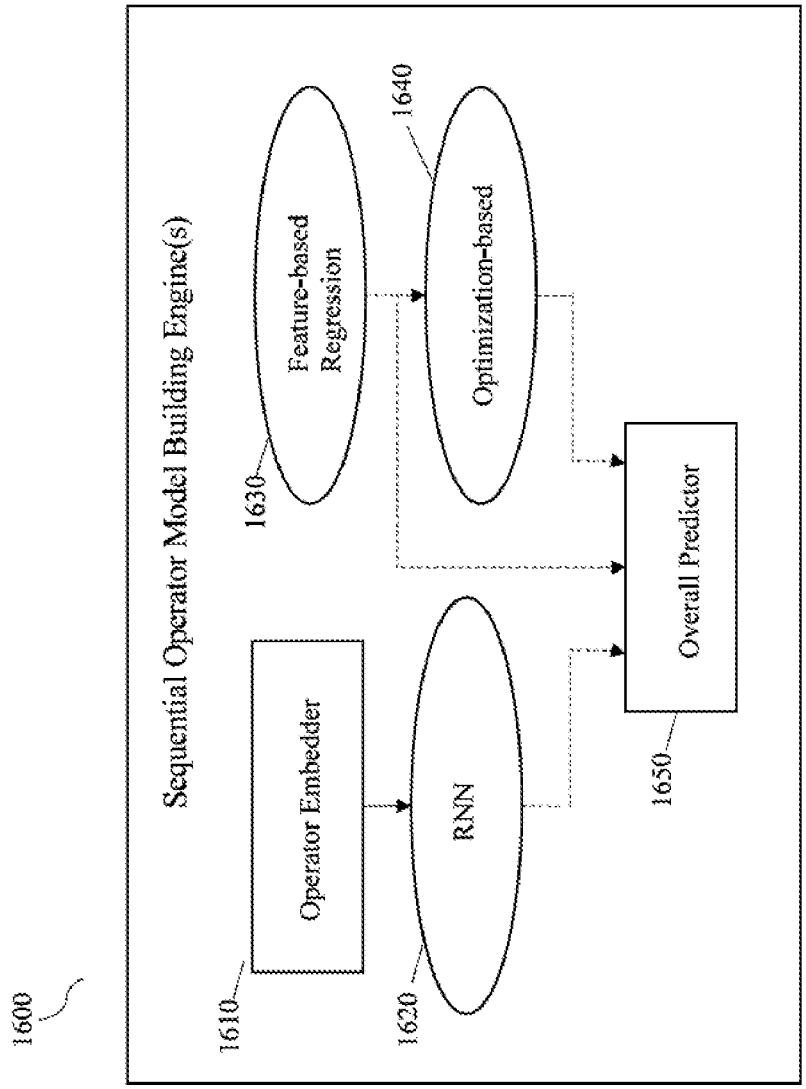
FIG. 16 illustrates a configuration of a sequential operator model building engine.

The sequential operator model building engine 1600 of FIG. 16 attempts to create a data preparation recommendation model utilizing two types of data collected within the ground truth 126. First the model building engine 1600 utilizes temporal dependency between operators, and previous data-prep steps that users have already taken (e.g., after a GroupBy, predict an Aggregation is likely to follow). And second, the model building engine utilizes the characteristics of input tables (e.g., given the structure of the input table a specific data preparation operator is more likely over other operators).

At a high level, the task of predicting the next operator closely resembles the task of predicting the next token in natural language processing (NLP), which also exploits contextual information such as sequential token correlation. The architecture, which is inspired by NLP neural language models, are utilized for some embodiments of a data preparation recommendation model 128. At least one embodiment utilizes a recurrent neural network (RNN) to create a machine learned predictive model for this prediction task.

FIG. 16 shows the overall architecture for the sequential operator model building engine 1600. The ground truth 126 is applied to the first component, an embedding component 1610 that produces continuous representations of operators. The embedded representations are applied to an RNN component 1620 which generates one or more models with sequential dependency. Simultaneously, the ground truth 126 is also applied to the table-based components 1630, 1640 to produce one or more models which can predict the likelihood of an operator based solely on the characteristics of the current table T. These table-based components 1630, 1640 are adapted from models for the single-operator predictors disclosed in the foregoing.

Both the sequence-based prediction models and the table-based prediction models are applied to an overall predictor component 650 which generates an overall prediction of the likely next operator utilizing the outputs of the RNN component 1620 and the table-based components 1630, 1640. In one embodiment, overall predictor 1650 is a multilayer perceptron (MLP) layer.

Alternatively, in some embodiments, the sequential operator model building engine 1600 comprises the RNN component 1620 alone, without the table-based prediction components 1630, 1640. In another embodiment, the sequential operator model building engine 1600 comprises the table-based prediction components 1630, 1640 alone without the RNN component 1620.

Figure 17:
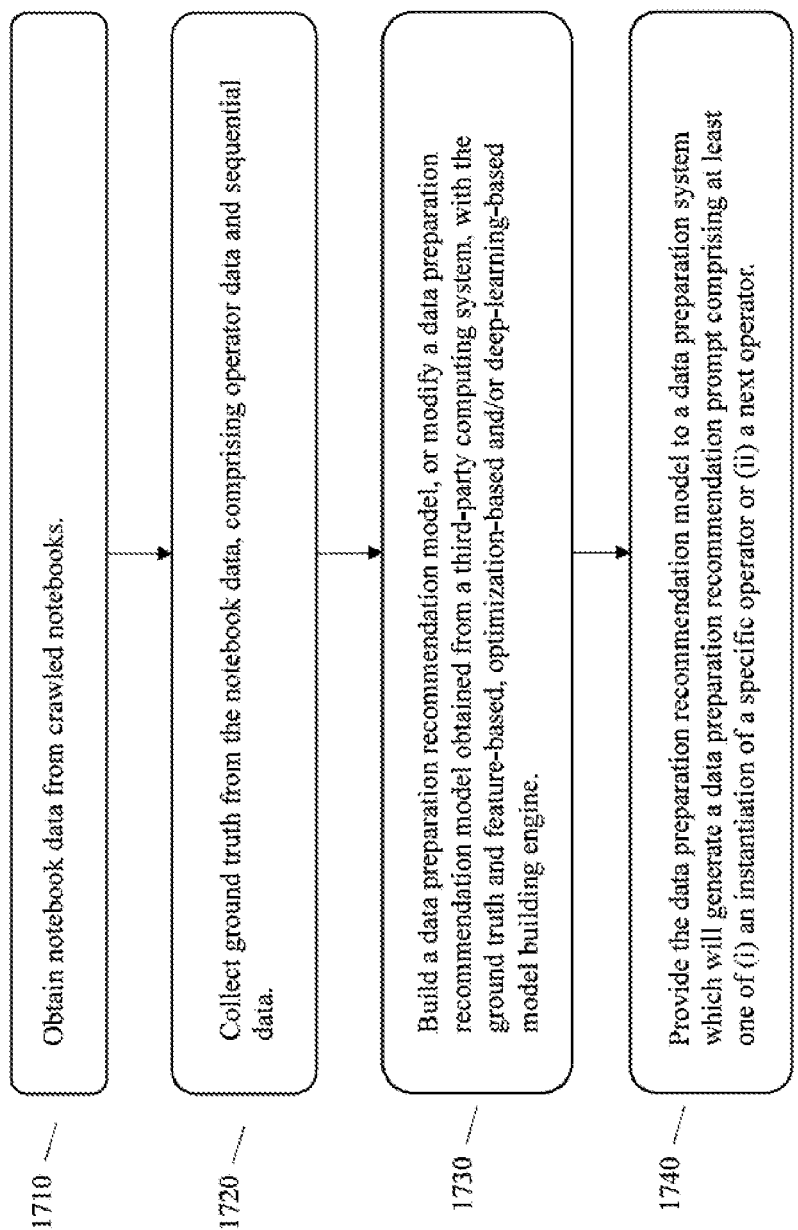
FIG. 17 illustrates a flowchart of acts associated with methods performed by a data preparation model building computing system.

Attention will now be directed to FIG. 17, which is an illustrated flowchart of various acts associated with the disclosed methods in which the data preparation model building computing system 100 generates a data preparation recommendation model 128.

It will be appreciated, with regard to FIG. 17, that the following discussion refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed. It is also noted that the various acts that are performed are performed in response to one or more processors of a computing system executing one or more computer-executable instructions that are stored on one or more computer-readable media, wherein the computer-executable instructions are configured to cause the computer system to implement the disclosed act(s) when executed by the one or more processors.

As illustrated in FIG. 17, the first illustrated act includes an act of the data preparation recommendation building computing system 100 obtaining notebook data from a plurality of crawled notebooks (act 1710). In some instances, these notebooks are accessed by the data preparation recommendation building computing system 100 from third-party computing systems 170 through a network connection 102.

The next illustrated act includes the data preparation model building computing system 100 collecting ground truth from the notebook data (act 1720). The ground truth is comprised of operator data and sequential data of all data preparation operators within the notebook data.

The next act includes the data preparation model building computing system 100 building a data preparation recommendation model 128, (or it modifies an existing data preparation recommendation model 128) with the ground truth, utilizing feature-based, optimization-based, and/or deep learning-based model building engine 160 (act 1730).

Finally, the data preparation model building computing system 100 provides the data preparation recommendation model 128 to a data preparation system 180 (act 1740). The data preparation system 180 will then utilize the data preparation recommendation model to generate data preparation recommendation prompt comprising at least one of (i) an instantiation of a specific operator or (ii) a next operator.

Figure 18:
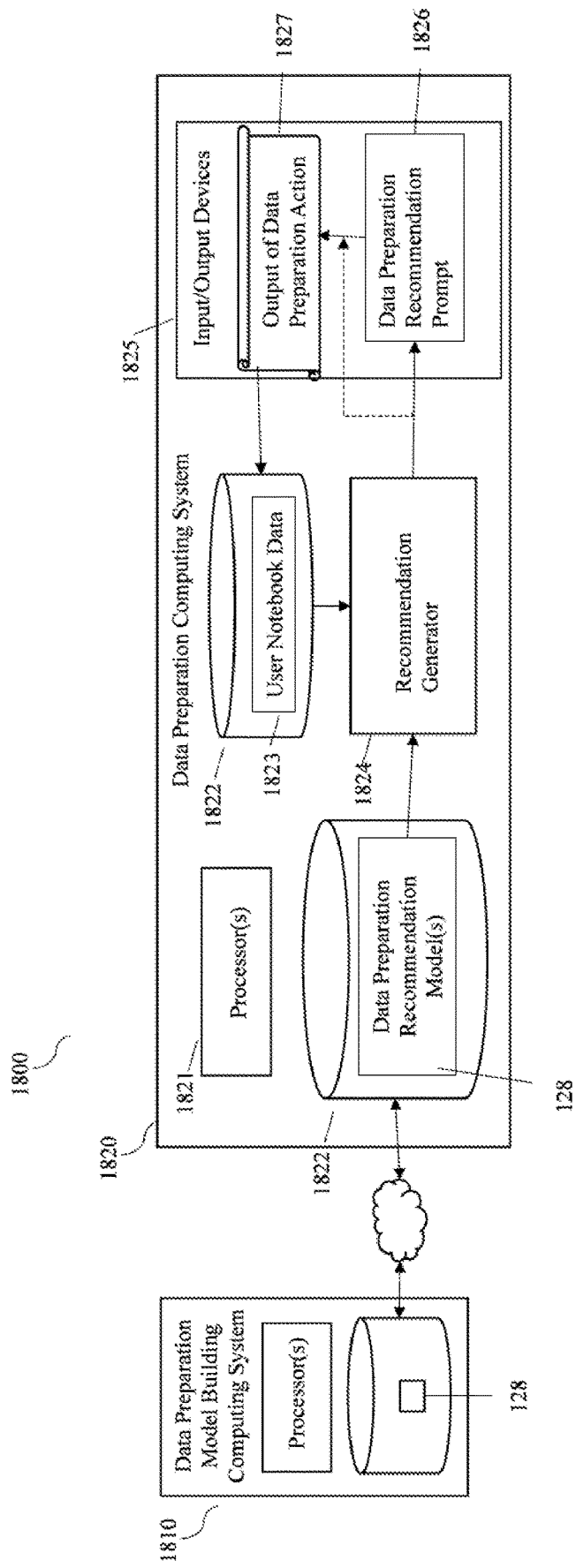
FIG. 18 illustrates a computing system architecture of a data preparation computing system.

FIG. 18 illustrates at least one embodiment of a computing system architecture 1800 of a data preparation computing system 1820 which utilizes the data preparation recommendation model 128 to assist users with self-service data preparation. The data preparation computing system 1820 has one or more storage devices 1822 with computer-executable instructions that when executed by one or more processors 1821 cause various functions to be performed. In some embodiments, the data preparation computing system utilizes an existing notebook interface or platform, including but not limited to, Power BI, Excel, Tableau, Jupyter, or Zeppelin.

In at least one embodiment, the data preparation computing system 1820 first obtains the one or more data preparation recommendation model(s) 128 from the data preparation model building computing system 1810 through a network connection and the data preparation recommendation model 128 is stored on one or more storage devices 1822. In some embodiments, the data preparation computing system 1820 also obtains user notebook data 1823 which comprises notebook data of the user's specific notebook as described above, but also includes user input (e.g. a high-level intent to perform a specific operator, a specific task, a generic intent for a type of data preparation, or other user indications) and system input as will be described further hereafter.

In at least one embodiment, the data preparation computing system applies the user notebook data and the data preparation recommendation model to a recommendation generator 1824 module. In some embodiments, the recommendation generator 1824 identifies characteristics of the user notebook data 1823 and applies the user notebook data and the characteristics of the user notebook data to the data preparation recommendation model. Nonlimiting examples of characteristics of notebook data include: the characteristics of the current table(s) or value(s) within the data pipeline, relevant subsets of the notebook data, and the features which were used to generate the data preparation recommendation model described in the foregoing disclosure.

In some embodiments, the recommendation generator 1824 generates a data preparation recommendation model output which is then utilized to generate a data preparation recommendation prompt. In at least one embodiment, the data preparation recommendation prompt comprises an action to be performed on the notebook data including a recommended data preparation operation.

In some embodiments, the data preparation recommendation prompt 1826 is provided to input/output devices 1825, to display the data recommendation prompt 1826 to the user. The input/output devices 1825 include display screens, non-visual displays, printers, lights, speakers, keyboards, computer mouses (i.e. manually-operated user-selection equipment), touch pads, joysticks, cameras, microphones, etc. In at least one embodiment, the data preparation recommendation prompt 826 is conveyed to the user non-visually.

In at least one embodiment, the data preparation recommendation prompt 1826 includes a recommendation data preparation action as for at least one of (i) a specific instantiation of a specific operator or (ii) a likely next operator. In at least one embodiment, the data preparation recommendation prompt recommends that no action be taken on the notebook data.

In at least one embodiment, the data preparation recommendation prompt 1826 includes more than one recommended actions displayed as list of possible actions for a user to select from. In at least one embodiment, the data preparation recommendation prompt 1826 includes an interactive link from which the user can select to perform one or more actions from the data preparation recommendation prompt. In at least one embodiment the data preparation recommendation prompt 1826 includes a visual preview of the one or more results of corresponding recommended data preparation actions being applied to the notebook data, such that the user can visualize a subset of the resulting notebook data if the corresponding/recommended action is selected.

In at least one embodiment, the recommendation generator 1824 requires some user input during the generation of a data preparation recommendation model output. For example, in calculating an instantiation of a pivot operator, the recommendation generator 1824 may perform the first prediction task, to predict the columns most likely to be used as an index or header and display this prediction to the user. From this list, users can select columns of interest for their analysis. For example, using the example in FIG. 10, users may select "Sector", "Ticker", "Company", "Year" as relevant dimensions, and "Revenue" as the aggregation-column. Following the user-selected dimension columns the recommendation generator 1824 then initiates the second prediction task of a pivot operator, to accurately predict the split of the index and header columns and provide a data preparation recommendation to the user.

In at least one embodiment, the data preparation recommendation prompt 1826 is only displayed to a user once the probability of a data preparation recommendation model output exceeds a minimum probability threshold. In some embodiments, the probability threshold for data preparation recommendation model output is set by the user. In some embodiments the probability threshold for data preparation recommendation model output is dependent on the type of notebook interface being used by the data preparation computing system 1820 (i.e. Excel, Power BI, Tableau, Jupyter, or Zeppelin). For example, in at least one embodiment, notebook platforms which are typically utilized by more sophisticated users (i.e. Jupyter, or Zeppelin) would have lower probability threshold for the output of the data preparation recommendation model and platforms which are typically utilized by less sophisticated users (i.e. Excel, Power BI, or Tableau) which would have a higher probability threshold for the output of the data preparation recommendation model.

In at least one embodiment, the data preparation computing system 1820 will also perform an action on the notebook data based on the data preparation recommendation prompt 1826 comprising one or more data preparation operations. In at least one embodiment, the output of the action 1827 will be applied to the original notebook data 1823 as system input which is applied to the notebook data 1823 comprises one or more data preparation actions 1827 which have already been performed on the notebook data 1823.

In some embodiments, the data preparation computing system 1820 will only perform an action on the notebook data based on detected user input. In at least one embodiment, the data preparation computing system 1820 performs the data preparation action automatically without receiving user input wherein the data preparation action is based on the data preparation recommendation model output. In at least one embodiment, the data preparation computing system 1820 will perform the data preparation action automatically without generating or displaying a data preparation recommendation prompt to the user.

Figure 19:
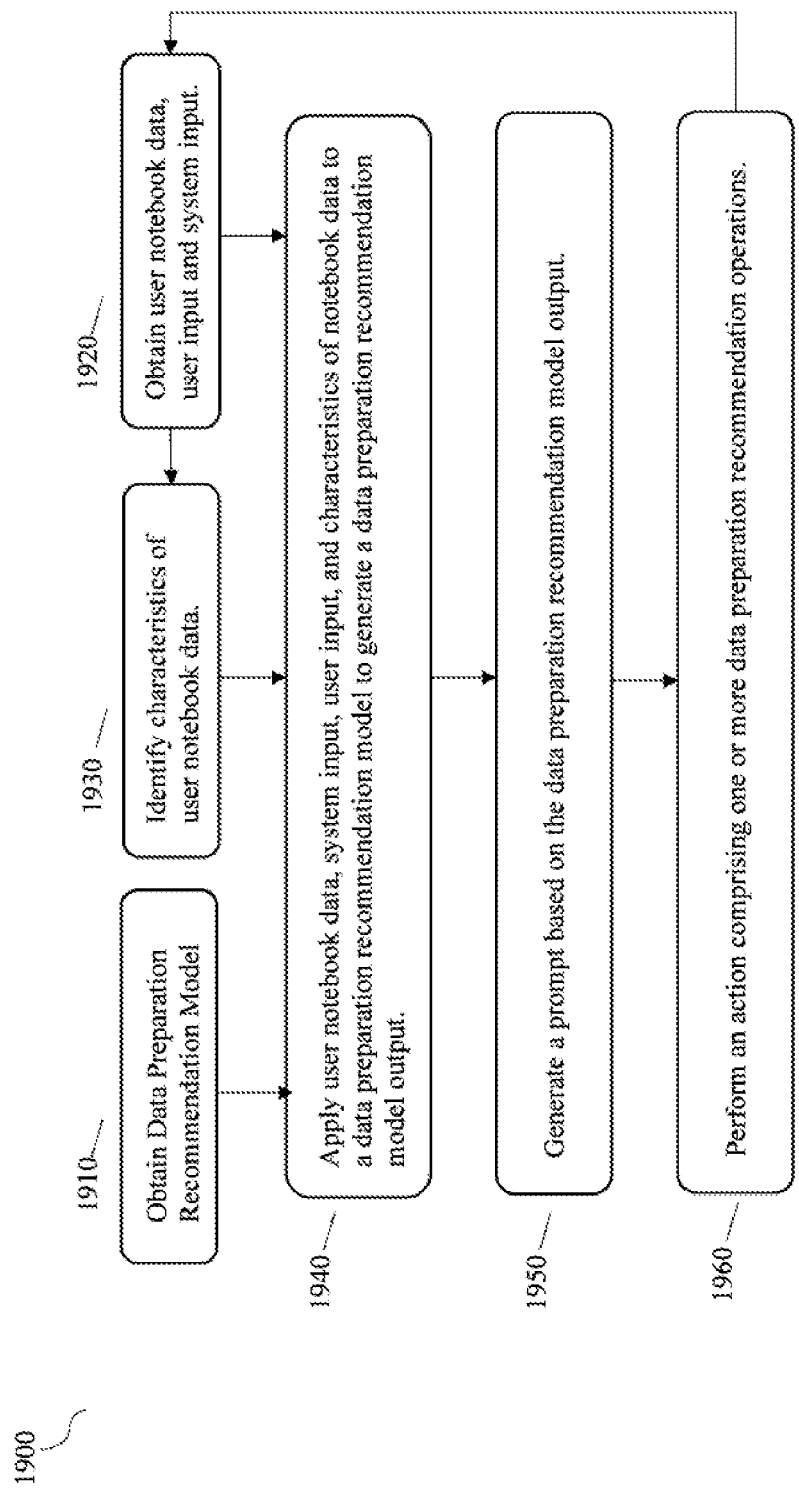
FIG. 19 illustrates a flowchart of acts associated with methods performed by a data preparation computing system.

Attention will now be directed to FIG. 19, which is an illustrated flowchart of various acts associated with the disclosed methods in which the data preparation computing system 1820 generates a data preparation recommendation prompt 1926.

It will be appreciated, with regard to FIG. 19, that the following discussion refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed. It is also noted that the various acts that are performed are performed in response to one or more processors of a computing system executing one or more computer-executable instructions that are stored on one or more computer-readable media, wherein the computer-executable instructions are configured to cause the computer system to implement the disclosed act(s) when executed by the one or more processors.

As illustrated in FIG. 19, the first act includes an act of the data preparation computing system 1820 obtaining one or more data preparation recommendation models (act 1910).

The next illustrated act includes the act of the data preparation computing system 1820 obtaining user notebook data, user input, and system input (act 1920).

The next act includes the data preparation computing system 820 identifying characteristics of the user notebook data (act 1930).

The next act includes the data preparation computing system 1820 applying the user notebook data, user input, system input, and the characteristics of the notebook data to the data preparation recommendation model to generate a data preparation recommendation model output (act 1940).

The next illustrated act includes the data preparation computing system 1820 generating a prompt based on the data preparation recommendation model output (act 1950).

In the last illustrated act, the data preparation computing system 1820 performs one or more actions comprising one or more data preparation recommendation operations on the user notebook data (act 1960). The new user notebook data is then modified with the one or more actions of data preparation operations and may be reapplied as system input for further self-service data preparation by the user.

With regard to the foregoing it will be appreciated that the disclosed embodiments facilitate improvements over existing technologies for obtaining and performing data preparation, particularly using notebook data. In some instances, for example, the disclosed systems enable a computing system to generate models based on existing notebook data to make predictions on operators to be performed with new notebook data. In some instances, they also enable a system to use a training model to perform data preparation analyzing attributes of the data to make predictions for the data analysts.

It will be appreciated that the disclosed embodiments may include and/or be performed by a computing system that includes one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media. In some instances, these specific purpose computers are the systems described above in FIGS. 1 and 8 for example.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented by a data preparation model building computing system to generate a data preparation recommendation model in order to assist a user with self-service data preparation of input data, the method comprising:
   instantiating a notebook crawler that obtains notebook data associated with one or more notebook, the notebook data comprising input data and a record of corresponding operator data comprising features for one or more operators used to perform one or more corresponding data preparations operations on the input data;
   instantiating a ground truth engine that replays function invocations used for one or more operators of the one or more corresponding data preparation operations identified in the record of corresponding operator data, the ground truth engine replaying the function invocations by at least accessing the call stack for a function invocation that was used to perform a corresponding data preparation operation, to identify ground truth comprising operator data and sequential data for an operator included in a record of corresponding operator data;
   instantiating the model building engine that generates a data preparation recommendation model utilizing the ground truth; and
   causing the computing system to provide the data preparation recommendation model to a data preparation system that is configured to generate a data preparation recommendation in performing data preparation on notebook data of a user notebook and based on identified characteristics of the notebook data and identified characteristics of detected user input associated with one or more operators provided by a user while interacting with the user notebook, the data preparation recommendation comprising at least one of (i) one or more instantiations of a specific operator or (ii) one or more next operators.

2. The method of claim 1, wherein the method further comprises identifying one or more missing data packages associated with the notebook data by identifying and parsing error messages to identify a name of the one or more missing data packages and by installing a dependency providing the computing system access to the missing data package.

3. The method of claim 1, wherein the method further comprises identifying ground truth by finding missing data files by searching for (i) one or more missing file names within a code repository, (ii) one or more uniform research locators in text cells adjacent to the missing data file, and (iii) one or more file names within public data sets.

4. The method of claim 1, wherein the method further comprises applying one or more various different model building engine modules to the ground truth, wherein the various different model building engine modules include feature-based, optimization-based, and deep-learning based modules.

5. The method of claim 4, wherein the method comprises applying the ground truth to first the feature-based model building engine module and second the optimization-based model building engine module which utilizes an affinity-maximizing pivot-table.

6. The method of claim 1, wherein the method further comprises building and training the model from the ground truth.

7. The method of claim 1, wherein the method further comprises training and modifying an existing predictive data preparation recommendation model obtained from a third-party system.

8. The method of claim 1, wherein the method further comprises utilizing a syntactic analyzer for selecting a subset of the notebook data comprising select notebook data which includes operator data which is relevant to the model building engine for building a data preparation recommendation model for a specific operator.

9. The method of claim 8, wherein the method further comprises selectively applying the select notebook data to only the ground truth engine.

10. A method implemented by a data preparation computing system which prompts a user with data preparation recommendations in order to assist the user with self-service data preparation of notebook data, wherein the method comprises:
   accessing a user notebook comprising user notebook data and causing the user notebook to be displayed in a notebook interface on one or more display screens;
   accessing a data preparation recommendation model which has been generated with ground truth comprising operator data and sequential data obtained from training notebook data, the training notebook data including input data and a record of corresponding operator data comprising features for one or more operators used to perform one or more corresponding data preparations operations on the input data;
   identifying characteristics of the user notebook data;
   obtaining user input directed at the user notebook data;

applying the user input, notebook data, and the characteristics of the notebook data as model input to the data preparation recommendation model to generate a data preparation recommendation model output;

generating a data preparation recommendation prompt corresponding to the data preparation recommendation model output for performing an action comprising one or more recommended data preparation operations on the data within the notebook; and displaying the data preparation recommendation prompt within the notebook interface on the one or more display screens.

11. The method of claim 10, wherein the method further comprises performing a recommended data preparation operation on the notebook data.

12. The method of claim 11, wherein the notebook data includes system input comprising one or more actions which have already been performed on the notebook data.

13. The method of claim 11, wherein the method further comprises displaying an interactive visual link corresponding to the data preparation recommendation prompt, which is operable when selected, to cause the notebook to perform the action comprising the one or more recommended data preparation operations.

14. The method of claim 13, wherein the method further comprises automatically performing the action.

15. The method of claim 10, wherein the notebook interface comprises one of a Jupyter notebook interface or Zeppelin notebook interface.

16. The method of claim 10, wherein the method further comprises applying a threshold requirement comprising a minimal statistical probability for the data preparation recommendation model output, wherein the threshold requirement is dependent on a type of notebook used by the data preparation computing system.

17. The method of claim 10, wherein the data preparation recommendation model output comprises a predicted (i) desired instantiation of a specific operator or (ii) desired next operator.

18. The method of claim 17, wherein the method further comprises selecting the desired instantiation of the specific operator from a plurality of implementations of the specific operator based on different functions of the specific operator.

19. The method of claim 17, wherein the method further comprises selecting the desired instantiation of the specific operator from a plurality of implementations of the specific operator based on based on different notebook data or different subsets of the notebook data.

20. The method of claim 10, wherein the method further comprises displaying an animation of the action as part of the data preparation recommendation prompt prior to receiving user input selecting the data preparation recommendation prompt for performing the action.

* * * * *